United States Patent [19]

Candy et al.

[11] Patent Number: 5,179,734
[45] Date of Patent: Jan. 12, 1993

[54] THREADED INTERPRETIVE DATA PROCESSOR

[75] Inventors: Donald W. Candy, Richardson; Granville Ott, Lubbock, both of Tex.

[73] Assignee: Texas Instruments Incorporated, Dallas, Tex.

[21] Appl. No.: 585,478

[22] Filed: Mar. 2, 1984

[51] Int. Cl.$^5$ .............................. G06F 9/40
[52] U.S. Cl. .................. 395/800; 364/DIG. 1; 364/244.8; 364/262.5; 364/263; 395/375
[58] Field of Search ... 364/200 MS File, 900 MS File; 395/800, 375

[56] References Cited

U.S. PATENT DOCUMENTS

| | | | |
|---|---|---|---|
| 3,675,218 | 7/1972 | Sechler | 365/154 X |
| 3,889,243 | 6/1975 | Drimak | 364/200 |
| 3,938,103 | 2/1976 | Welin | 364/200 |
| 4,193,197 | 3/1980 | Gersbach | 365/189 X |
| 4,245,302 | 1/1981 | Amdahl | 364/200 |
| 4,323,963 | 4/1982 | Wu | 364/200 |
| 4,323,981 | 4/1982 | Nakamura | 364/200 X |
| 4,334,269 | 6/1982 | Shibasaki et al. | 364/200 |
| 4,375,678 | 3/1983 | Krebs, Jr. | 365/238 |
| 4,384,324 | 5/1983 | Kim et al. | 364/200 |
| 4,402,042 | 8/1983 | Guttag | 364/200 |
| 4,405,983 | 10/1983 | Perez-Mendez | 364/200 |
| 4,430,708 | 2/1984 | Isaman | 364/200 |
| 4,463,441 | 7/1984 | Kassabov et al. | 364/900 |
| 4,491,937 | 1/1985 | Chan | 365/155 X |
| 4,569,016 | 2/1986 | Hao et al. | 364/200 |
| 4,594,655 | 6/1986 | Hao et al. | 364/200 |
| 4,611,278 | 9/1986 | Boothroyd et al. | 364/200 |
| 4,737,933 | 4/1988 | Chiang et al. | 364/900 |

OTHER PUBLICATIONS

Lochiger R. G., "Threaded Interpretive Languages," BYTE Publications, 1981, pp. 1-73.
Ralston, A. Meek CL, Encyclopedia of Computer Science, Petrocelli/Charter, New York, 1976, pp. 267, 1040, 1041.
Ramamoorthy CV, "Pipeline Architecture", Computing Surveys, vol. 9, No. 1, Mar. 1977, pp. 61-65.
Sippl and Sippl, "Computer Dictionary and Handbook," Howard W Sams and Co., Indianapolis, Ind., 1980, pp. 200, 386.

*Primary Examiner*—David L. Clark
*Attorney, Agent, or Firm*—William E. Hiller; Richard L. Donaldson

[57] ABSTRACT

A threaded interpretive processor includes an input-/output (I/O) bus (10) and an address bus (12) for carrying data thereon. An internal ROM/RAM (80) is interfaced with the I/O bus (10) and is addressable from the address bus (12). Instructions placed on the I/O bus (10) are clocked onto the address bus (12) through an instruction pointer (86) in response to a system clock (26). The data on the I/O bus (10) is also clocked to a microcode ROM (60) through an instruction register (58). The microcode ROM (60) outputs microcode instructions to control the system operation. The microcode instructions control a parameter stack (18). The parameter stack (18) consists of an eight register rotary stack (44) that has the outputs thereof simultaneously addressable by two output buses (46) and (48) and the inputs thereof addressable by an interface bus (36) and a data input bus (50). The outputs of the rotary stack (44) are input to an arithmetic logic unit (16), the output of which is input back into the rotary stack (44). Transfer gates are provided to control data flow on the output buses and input buses such that the data in the rotary stack (44) can be manipulated. Addresses of microcode instructions are sequentially placed onto the I/O bus (10) for controlling the microcode ROM (60) and the instruction pointer (86) increments this instruction address to select the next sequential instruction address. In this manner, instructions can be sequentially executed in sequential clock cycles.

29 Claims, 6 Drawing Sheets

THREADED INTERPRETIVE DATA PROCESSOR

TECHNICAL FIELD OF THE INVENTION

The present invention pertains in general to data processors and, more particularly, to a data processor that implements portions of a threaded interpretive language in hardware such that multiple software functions can be performed in a single clock cycle.

BACKGROUND OF THE INVENTION

As technology advances, the demand for high speed digital computers increases to meet the need for both computational and data processing applications. The speed at which a given task can be performed by a central processing unit (CPU) depends upon numerous factors, two of the most important being the execution speed of the central processing unit and the program language implemented therein. While the execution speed is a function of cost factors and the state of art in the device technology, the programming language is generally a factor which can be tailored to increase both the speed of programming for a given task and also the speed of execution. The optimal programming language is assembly language which translates assembly code into machine language and, if the particular application permits its use, is the most efficient. Most programming languages, however, convert a source language into a target language through the use of a compiler. To produce an efficient code, the compilers are normally complex and require a large amount of memory which is seldom available on the small micro or minicomputers. To this end, various languages have been developed to improve programming efficiency without utilizing large compilers. One such language type is generally classified under the title "Threaded Interpretive Languages". Threaded intrepretive languages execute faster than other high level languages and are only between 20% to 75% slower than equivalent assembly language programs. In addition, threaded intrepretive languages provide a very compact compiled code which require less memory than equivalent assembly language programs. These languages are discussed in R. G. Loeliger, *Threaded Interpretive Languages*, 1981, and Leo Brodie, *Starting Forth*, 1981.

A threaded interpretive language utilizes an interpreter that accepts the source language and executes it directly without first producing a target language. A threaded code interpreter first translates the source language to an intermediate language or internal form and then executes the internal form. The internal form consists of a list of addresses of previously defined internal forms. This list is threaded together or compiled and then each of these addresses or internal forms is consecutively executed. To aid in the efficiency of interpretation, threaded interpretive languages resort to a series of stacks that operate in reverse polish notation; that is, the order in which expressions are to be evaluated is specified. For example, the numbers, identifiers or operands appear in the same order as they are to be applied.

A threaded interpretive language generally utilizes two stacks, a data stack and a return stack, both of which are last-in first-out push-down stacks. The data stack is utilized to store numbers and addresses of operands and the return stack is utilized to store program flow control parameters. During utilization of a threaded interpretive language, a plurality of program steps must be executed for each task that is performed.

Normally, the list of addresses for the internal forms is referred to as secondary code bodies or "secondaries" and the internal form to be executed by the interpreter is referred to as a "primitive", which is a code body consisting of machine code that implements the desired action. Each thread of a threaded list terminates as a primitive and then returns to thread through the secondaries once more to execute another primitive. Each time a primitive is executed, addresses of a given secondary must be stored and, once the primitive is executed, retrieved to return to the proper location in the program. Obviously, the most efficient type of programming application is one which executes a series of primitives without threading through a large number of secondaries. This type of program will execute at essentially the speed of an assembly language program.

For a given programming application with threaded interpretive languages using conventional microprocessors, a finite number of clock cycles are required to execute the machine code that makes up a given primitive. For example, in a threaded interpretive language implemented on a microprocessor based system utilizing a Z80 microprocessor manufactured by Intel Corp., a primitive for duplicating the top element in the data stack would require approximately 32 timing states of the microprocessor. In the performance of another primitive, the Z80 microprocessor based system would require approximately 10 timing states to discard the top stack item. Since the primitive is the most efficient level of operation for a threaded interpretive language, execution at the primitive level constitutes the efficiency limit of a programming language. Therefore, there exists a need for an alternate technique to increase efficiency by executing portions of the programs at a faster rate and/or executing the primitives at a highly increased rate.

SUMMARY OF THE INVENTION

The present invention disclosed and claimed herein comprises a threaded interpretive processor. The processor includes a data bus for carrying control signals thereon which provides substantially improved processing speeds. A last-in first-out rotary stack is provided that has a plurality of data registers for storage of data therein. The data registers are simultaneously addressable such that data can be input or output simultaneously to one or more of the data registers. An arithmetic logic unit is provided to perform arithmetic and logic operations on the data in the registers. To input the data to the arithmetic unit, first and second buses are provided that selectively interface with the output of select ones of the data registers in the rotary stack. A third bus is provided for selectively connecting the output of the arithmetic unit to a select one of the rotary data registers. A fourth bus is also provided for transferring data from one of the first and second buses to the input of a select one of the rotary stack data registers. Microcode instructions to control the connections of the first, second, third and fourth buses and the type of operation performed by the arithmetic logic unit are stored in a storage medium. The microcode instructions are addressed in response to program instructions on the data bus to output a select microcode instruction containing the appropriate information. A control mechanism is provided for controlling the data flow on the first, second, third and fourth data buses and the function performed by the arithmetic logic unit in response to the selected microcode instruction. The particular function to be executed in response to the selected microcode instruction is then executed by simultaneously manipulating the data in the appropriate rotary stack data registers and the operation of the arithmetic logic unit.

In another embodiment of the present invention, the microcode addresses are stored in a storage medium in groups, each group having the addresses therein arranged in a predetermined pattern. In response to program instructions on the data bus, a select one of the groups is selected and the microcode addresses wherein sequentially placed on the data bus. Each of these microcode addresses is accessed and the appropriate microcode instruction output to the control mechanism to execute the instructions. After execution of the instructions, the next sequential microcode address is accessed from the second storage medium and placed on the data bus.

In yet another embodiment of the present invention, a secondary last-in first-out rotary data stack is provided that has a plurality of data registers for storage of data therein. The secondary data stack registers are also simultaneously addressable. The first and second buses are operable to transfer data from select ones of the secondary rotary data registers to the input of the arithmetic logic unit. The third bus is operable to selectively connect the output of the arithmetic logic unit to an input of a select one of the secondary rotary data registers. The fourth bus is operable to transfer data from one of the first and second output buses to the input of a select one of the secondary rotary data registers. A switching mechanism is provided for switching the interface between the rotary stack and the first, second, third and fourth buses to interface the transfer buses with the secondary rotary stack. Microcode data instructions are then accessed to manipulate the data that is stored in the secondary stack data registers. A timing unit is provided for periodically activating the switching mechanism to allow data in the secondary rotary data registers to be manipulated by the first, second, third and fourth buses and the arithmetic logic unit such that data manipulation can occur in the secondary rotary stack registers independent of data manipulation in the primary data registers.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
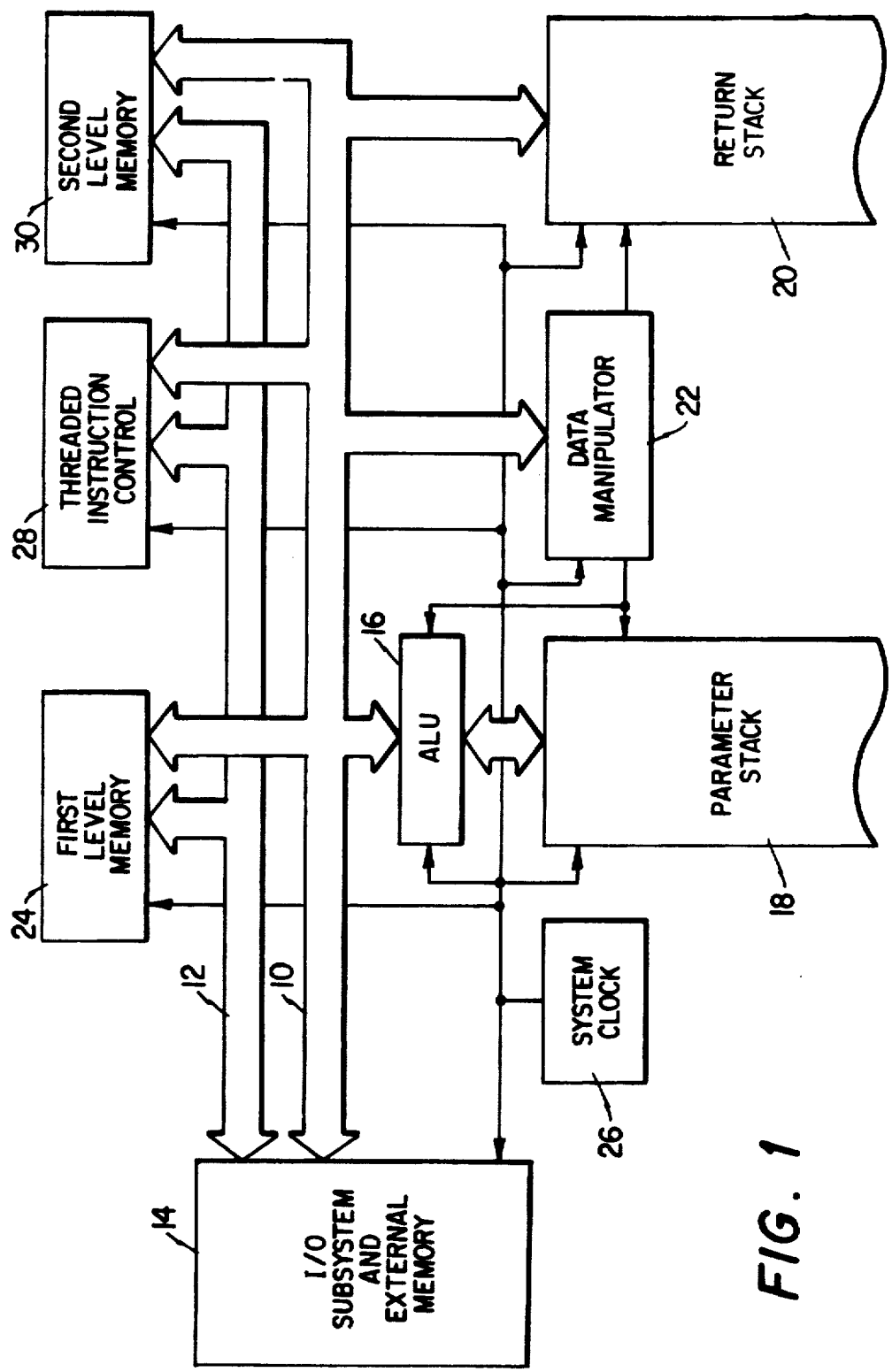
FIG. 1 illustrates a block diagram of a threaded interpretive processor in accordance with the present invention.

Referring now to FIG. 1, there is illustrated a basic block diagram of a threaded interpretive language (TIL) processor in accordance with the present invention. The TIL processor of the present invention is capable of performing multiple data selection and arithmetic operations within a single or very few clock cycles. The TIL processor includes a main input/output (I/O) data bus 10 and an address bus 12 which are interfaced with a I/O Subsystem and External Memory (Memory) 14. AN arithmetic logic unit (ALU) 16 is interfaced with the I/O bus 10 and is operable to perform arithmetic and logic functions on data input thereto.

A parameter stack 18 is interfaced with the ALU 16 and is a last-in first-out stack implemented in hardware. A return stack 20, which is also a last-in first-out stack, is interfaced with the I/O bus 10 and is operable for storing data and addresses. The data in the parameter stack 18 and the return stack 20 is manipulated by a data manipulator 22. The data manipulator 22 also controls the operation of the ALU 16 and contains microcode instructions stored at select locations or addresses therein. The data manipulator 22 operates in response to microcode instruction addresses received from the I/O bus 10. These microcode instructions determined how the data is shifted around in the stacks 18 and 20 and what functions the ALU 16 performs on data input thereto. All of the operations of the parameter stack 18, the return stack 20 an the data manipulator 22 are controlled by a system clock 26. The system clock 26 is also connected to the memory 14 to provide a time base therefor.

There are two levels of control imbedded in the schematic diagram of FIG. 1. The first level of control is for execution of "primitives". A primitive is the basic instruction that is executed by the TIL and consists of such things as manipulating data within the parameter stack 18, performing arithmetic or logic operations on the data contained therein and also shifting data in and out of the parameter stack 18. These operations will be described in more detail hereinbelow. The second level of operation involves the actual "threading together" of primitive instructions with "threaded lists" of primitives, which lists are termed "secondaries". The secondaries are essentially subroutines comprised of a group of primitive instructions and the steps necessary to execute these primitive instructions.

A first level memory 24 is interfaced with the I/O bus 10 and the address bus 12 and is operable to store microcode instructions in the form of addresses for the data manipulator 22. These instructions are received by the data manipulator 22 from the I/O bus 10 to thereby execute the instruction. In operation, the first level memory 24 is addressed from the address bus 12 to output a microcode instruction address onto the I/O bus 10 for controlling the data manipulator 22. The functions coded in the microcode instructions are executed within a single clock cycle for most manipulations of the parameter stack 18. However, as will be described hereinbelow, some functions require additional clock cycles, such as multiplication with the ALU 16.

A threaded instruction control 28 is provided that interfaces with a second level memory 30 through the I/O bus 10 and the address bus 12 to provide the second level of control 28 for the TIL. In operation, the threaded instruction control initiates one of a plurality of threaded lists stored in the second level memory 30 by addressing the second level memory 30 through the address bus 12. The second level memory 30 then outputs data therefrom in the form of an address for the first level memory 24. The threaded instruction control 28 fetches this address from the I/O bus 10 and places it on the address bus 12. When this address is placed on the address bus 12 and the first level memory 24 is addressed, the data stored in that address is output to select a microcode instruction in the data manipulator 22 to execute a primitive. Simultaneously with placement of the address for the first level memory 24 onto the address bus 12, thereby addressing the data manipulator 22, the threaded instruction control 28 selects the next sequential address for the threaded list from the second level memory 30 for placement on the address bus 12 after execution of the preceding instruction. In this manner, the next microcode address can be placed in the I/O bus 10 to address the data manipulator 22 after the primitive has been executed such that the next sequential instruction in the threaded list can be executed. Therefore, the threaded instruction control 28 steps through a desired threaded list to sequentially place microcode addresses from the first level memory 24 onto the I/O bus 10. As soon as these microcode addresses are placed onto the I/O bus 10, they are fetched by the data manipulator 22 and the instructions contained at the particular locations responding to those addresses are executed.

After a desired threaded list is executed, another threaded list is then selected from memory and executed. In order to facilitate a large number of threaded lists, the memory 14 is provided. The memory 14 is connected to both the I/O bus 10 and the address bus 12 to supplement the second level memory 30. In this manner, limitations experienced in fabricating the threaded interpretive processor of the present invention onto a single semiconductor chip can be overcome in terms of memory capacity. It is only necessary to place an address onto the address bus 12 in order to determine the location in memory from which data is to be retrieved. This data retrieval is done under control of the threaded instruction control 28.

In executing a program with the TIL of the present invention, a number of secondaries may have to be executed prior to executing a primitive. The primitive is the lowest level of execution which, after execution, returns back to the next higher level which is the secondary. After threading through a list of microcode instructions, the next threaded list is selected. The order in which these lists are executed is defined by a third level of execution. The different levels are more fully described in R. G. Loeliger, *Threaded Interpretive Languages*, (1981).

If a TIL is implemented in software, as present TIL's are, a primitive requires a finite number of steps or clock cycles in which to be executed. For example, extracting one data word from the parameter stack and shifting the remainder of the data words in the stack up by one position could require approximately ten to fifteen cycles of the system clock 26. During the time that the system clock is dedicated to performing this task, the rest of the system must wait. In the present invention, the parameter stack 18 is implemented in hardware in addition to the circuitry for performing arithmetic and logic operations in the form of the ALU 16. A simple manipulation or a complex manipulation is effectively performed in one cycle of the system clock. Therefore, to perform a very basic primitive would result in an increase in execution speed for that particular primitive by a factor of approximately ten to fifteen. For more complex primitives, this increase in execution speed can approach factors of forty to fifty. Since TIL's implemented in software execute primitives at essentially or close to machine language speed, the present invention increases execution speed for primitives over even the most efficient of programming techniques.

First Level of Program Execution-Primitives

Figure 2:
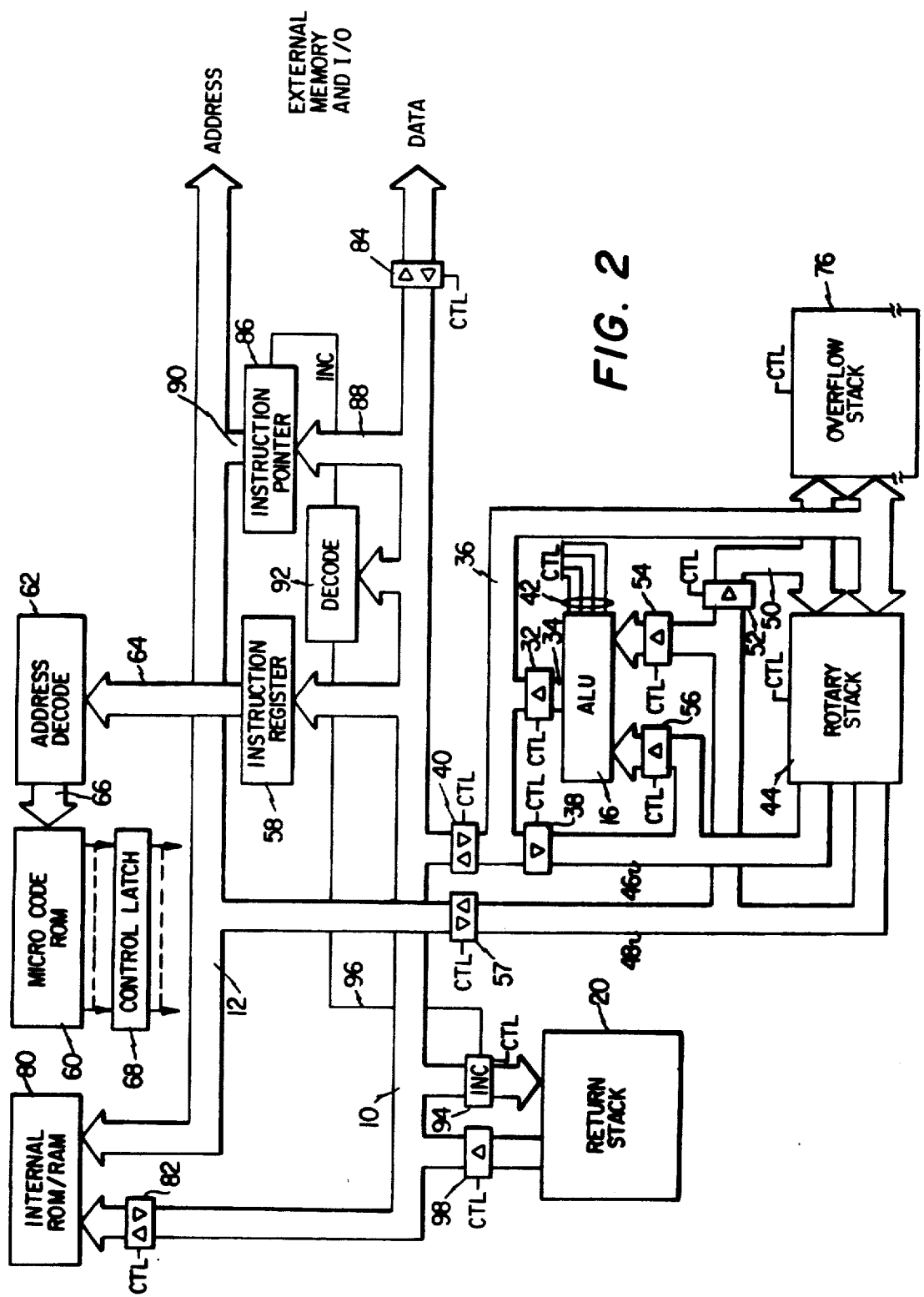
FIG. 2 illustrates an expanded block diagram of the threaded interpretive processor of FIG. 1.

Referring now to FIG. 2, there is illustrated an expanded block diagram of the TIL of FIG. 1. The ALU 16 interfaces with a unidirectional transfer gate 32 through a bus 34 and is oriented such that data flow is directed away from the ALU 16. The ALU 16 is a sixteen-bit wide ALU which can be comprised of four cascaded four-bit ALU's. The ALU 16 has two inputs and one output and performs various arithmetic and logic operations on the data input thereto. Representative functions of the ALU 16 can be found in Tables I and II on page 7-273 of the *TTL Data Book*, 2nd Ed., Texas Instruments, Inc. (1976).

The output of the transfer gate 32 is connected to an interface bus 36 which communicates with the I/O bus 10 through a bidirectional transfer gate 40. The transfer gates 32 and 40 have a control input (CTL) to determine data flow paths. The ALU 16 also receives a control signal on four control lines 42 which determines the arithmetic or logic function of the ALU 16. As will be described hereinbelow, the control signals are derived from microcode instructions in the data manipulator 22.

A last-in first-out rotary stack 44 is provided for storing sixteen-bit data words therein. The rotary stack 44 is comprised of a group of eight sixteen-bit wide data registers that are capable of being addressed in parallel such that data can be simultaneously placed in or output from all of the data registers. A control signal controls which of the registers therein output data and which of the registers therein receive data.

A first output data bus 46 is interfaced with the output of the rotary stack 44 and with one input of the ALU 16. A second output data bus 48 is interfaced with another input of the rotary stack 44 and with the second input of the ALU 16. The interface bus 36 is interfaced with one input of the rotary stack 44. An input data bus 50 is interfaced with the other input of the rotary stack 44, and a unidirectional transfer gate 52 provides an interface between the first output data bus 46 and the input data bus 50 to selectively transfer data from the output of the rotary stack 44 back to the input thereof in response to a control signal. A unidirectional transfer gate 54 is connected between the first input of the ALU 16 and the output data bus 46. A unidirectional transfer gate 56 is provided between the second input of the ALU 16 and the output data bus 48 to selectively control transfer of data to the ALU 16 in response to a control signal. A unidirectional transfer gate 38 is connected between the interface bus 36 and output data bus 46 to allow data from the I/O bus 10 to flow through the transfer gate 40 and into the input of the ALU 16. A bidirectional transfer gate 57 is connected between the output data bus 48 and the address bus 12 to control data flow therebetween.

The transfer gates 32, 38, 40, 52, 54 and 56 are operable to control data flow on the various buses connected to the rotary stack 44, the ALU 16 and to the I/O bus 10. As will be described hereinbelow, each control signal to each element controlled thereby is one-bit of a control word. Depending upon the particular control word that is generated, the direction of the data flow will be altered. For example, if data is to be extracted from the rotary stack 44 and operated upon by the ALU 16, the transfer gate 52 will be inactivated and the transfer gates 54 and 56 will be activated to place the output of the rotary stack 44 in communication with the inputs of the ALU 16. Appropriate registers within the rotary stack 44 will be interfaced with the appropriate output data buses 46 and 48 in accordance with the control word. The ALU 16 will also receive information on control lines 42 to determine the arithmetic or logic operation to be performed on the data input thereto. This data is then output from the ALU 16 to the transfer gate 32, which is activated, and onto the interface bus 36. If the data is to be placed back into the rotary stack 44, the transfer gates 38 and 40 are deactivated and the rotary stack 44 is provided with the appropriate control signal to determine which register in the rotary stack 44 the data is to be placed into. Once the control word having all of the control signals contained therein is generated, the entire operation can be accomplished within one cycle of the clock 26.

In order to execute a primitive in the parameter stack 18, control signals must be generated to control the various transfer gates, stacks and the ALU 16. In order to generate this control signal, the first level memory 24 must be addressed. The first level memory 24 consists of a microcode Read Only Memory (ROM) 60 which is functional to store a plurality of control words at select address locations therein. An address decoder 62 is provided that receives the output of the instruction register 58 through an interface bus 64 and decodes the address input thereto to determine whether the address is that of the primitive or a control function, as will be described hereinbelow. The output of the address decoder is then input to the address port of the microcode ROM 60 through an interface bus 66. The control word addressed in the microcode ROM 60 is then output to a control latch 68 to latch the control word on the output thereof. The control word on the output of the control latch 68 is operable to generate a plurality of control bits that operate various registers and control functions. For example, four sequential bits in the control word are allocated to the control lines 42 on the ALU 16 to provide the arithmetic or logic function to be performed thereby. Therefore, the control word and the logic state of bits therein determines the flow of data on all of the buses and the operation to be performed on select data by the ALU 16.

Although the microcode ROM 60 is operable to output control words to execute a primitive, "functional" control words are also output to control other functions of the threaded interpretive processor. In effect, the microcode ROM 60 has stored therein control words to both execute primitives and control all of the operations of the threaded interpretive processor. To appropriately address either a primitive control word or a functional control word in the microcode ROM 60, the address decoder 62 receives an address from the interface bus 64 and determines whether the address is a microcode address that corresponds to a primitive control word or an address that corresponds to address locations in either the memories 24 and 30. For example, the address locations 0-64 in the microcode ROM 60 can be allocated to primitive control words and, when any of these address locations is received from the interface bus 64, the address decoder 60 passes these addresses through the interface bus 66 to the microcode ROM 60 and a primitive control word is output. For addresses over 64, the address decoder 62 addresses a particular address location in the microcode ROM 60 for a given group of addresses. For example, addresses from 65 to 512 input to the address decoder 62 cause the address decoder 62 to address one address location in the microcode ROM 60 and output a functional control word. In a similar manner, addresses from 513 upward can cause the address decoder 62 to address a second functional control word. In this manner, addresses placed onto the I/O bus 10 and clocked through the instruction register 58 address either a primitive control word or a functional control word. The operation of these functional control words will be described in more detail hereinbelow.

The rotary stack 44, as described above, is a last-in first-out stack which can receive data on the input of any one of the data registers therein from the interface bus 36 or the input bus 50, and output data from any of the data registers therein onto the output buses 46 and 48. When data is placed onto the rotary stack 44, this is referred to as a "push" operation, and when data is output from the rotary stack 44, this is referred to as "pop" operation. Each time data is pushed onto the stack, the preceding data is pushed down into the stack. Since, in the preferred embodiment, the stack is only eight data registers deep, the data in the lowest priority data register must either be stored elsewhere or discarded. To save this data, an overflow stack 76 is provided. The overflow stack 76 is a last-in first-out stack which receives data and pushes this data into the stack or pops the data on the top of the stack back out. The input of the overflow stack 76 is connected to the input data bus 50 and the output of the overflow stack 76 is connected to the interface bus 36.

When data is input to the rotary stack 44, the interface bus 36 is connected to the highest priority register in the rotary stack 44 and the input data bus 50 is connected to both the output bus 46 through the transfer gate 52 and to the input of the overflow stack 76. The output data bus 46 is then connected to the output of the lowest priority register in the rotary stack 44 to output data at the input of the overflow stack 76. This entire operation, the execution of a primitive, is accomplished within a single clock cycle by the microcode instruction output by the control latch 68.

Second Level of Operation—Threaded Lists

Referring further to FIG. 2, a combination Read Only Memory/Random Access Memory (ROM/RAM) 80 is interfaced with the I/O bus 10 through a bidirectional transfer gate 82. The ROM portion provides permanent storage of data and the RAM portion provides a programmable memory which has a capability of accessing data on the I/O bus 10 and "writing" it to select address locations therein and also "reading" data from that select location and placing it back onto the I/O bus 10. Therefore, the RAM portion of the ROM/RAM 80 provides additional versatility in that it is externally programmable.

The ROM/RAM 80 is connected to the address bus 12 to be addressed thereby. Addresses on the address bus 12 corresponding to select locations in the ROM/RAM 80 cause the data contained therein to be output to the transfer gate 82. However, this data cannot be placed onto the I/O bus 10 unless the appropriate functional control word is output by the control latch 68. As described above, this functional control word is generated in response to a previous address placed on the I/O bus 10 and clocked through the instruction register 58. In addition to data being placed upon the I/O bus 10 by the ROM/RAM 80, data can also be placed onto the I/O bus 10 by the memory 14. To facilitate this, a bidirectional transfer gate 84 is provided between the I/O bus 10 and the memory 14. The transfer gate 84 is controlled by an appropriate control signal received from the control latch 68. The transfer gates 82 and 84 are operable to allow data from only one of the memories 14 or 80 to interface with the I/O bus 10 at any given time.

To place an address onto the address bus 12 from the I/O bus 10, an instruction pointer 86 is provided which has the input thereof connected to the I/O bus 10 through an interface bus 88 and the output thereof connected to the address bus 12 through an interface bus 90. The instruction pointer 86 is a data register which clocks through an address from the I/O bus 10 to the address bus 12 and, in addition, has the capability to increment this address by one through an increment control line (INC). The operation of the increment function will be described in more detail hereinbelow.

The data stored in the ROM/RAM 80 is a combination of addresses for primitive control words and also addresses for functional control words and these are arranged in "lists". These lists are similar to subroutines in that each list is a group of addresses for primitive and functional control words to be output by the microcode ROM 60. When the initial address of a given list is placed onto the address bus 12 and the transfer gate 82 is activated, the data contained at the addressed location in the ROM/RAM 80 is placed onto the I/O bus 10 and loaded into the instruction register 58. In the next clock cycle, the data is clocked through the instruction register 58 to the address decoder 62. The address decoder 62 then determines whether this is the address of a primitive control word or a functional control word and the microcode ROM 60 addressed to output the appropriate control word. After this address has been clocked through the instruction register 58 to output a control word, another address is simultaneously placed onto the address bus 12 by the instruction pointer 86 to address the next sequential piece of data in the given threaded list in the ROM/RAM 80. The instruction pointer is either loaded with an address in the previous clock cycle and this address clocked through, or the address is stored therein and incremented, as will be described hereinbelow.

To initiate a threaded list, the initial address of the threaded list is placed on the I/O bus 10 from either the ROM/RAM 80 or the memory 14 and loaded into the instruction register 58. This address is then clocked directly through the instruction pointer 86 to the address bus 12 and incremented therein. To determine whether the address should be loaded in the instruction pointer 86 or merely incremented and the previous address output therefrom, a decoder 92 is provided that is interfaced with the I/O bus 10. The decoder 92 is operable to determine whether the address on the I/O bus 10 corresponds to either a primitive instruction or to a higher level instruction such as that required to initiate a threaded list. Returning to the example above where the address locations in the microcode ROM 60 for a primitive were between 0 to 64, the decoder 92 senses the presence of higher order bits in the address to determine whether the data on the I/O bus 10 is above or below 64. If it is below 64, the instruction pointer 86 is incremented and, if it is above 64, the instruction pointer 86 is loaded with the address on the I/O bus 10 and this address clocked through on the next clock cycle.

Third Level of Operation—Main Program

In order to "thread together" lists that are stored in the ROM/RAM 80, a main program or third level of operation must be utilized. This is essentially a group of addresses stored at a particular location in either the ROM/RAM 80 or memory 14. This list of addresses can be a group of addresses, each address therein indicating the initial address of a particular one of the threaded lists described above. As this main program is stepped through, the threaded lists comprising the second level of operation are executed. After execution of a particular threaded list, the next sequential step in the main program must be placed onto the I/O bus 10. In order to accomplish this, the address is stored in the return stack 20 and incremented by one. To increment the address, an incrementing register 94 is disposed between the return stack 20 and the I/O bus 10. The incrementing register is controlled by the decoder 92 through a control line 96. The incrementing register 94 is under the control of the control word output by the control latch 68 and is operable to transfer data from the I/O bus 10 to the return stack 20 and also to operate as an incrementing latch in which the data is loaded on one clock cycle and clocked through on the next clock cycle and incremented by one.

The decoder 92 is operable to distinguish between addresses which represent the initial address of a threaded list or a step in the main program. When the decoder 92 determines that the data on the I/O bus 10 is an address allocated to the main program rather than the threaded list, the incrementing register 94 is incremented by one and clocked through to the return stack 20. After the threaded list has been executed, the return stack 20 is popped and the incremented address output onto the I/O bus 10 through a transfer gate 98. This is the next sequential address for the main program which is then clocked through the instruction pointer 86 to the address bus 12 to address the ROM/RAM 80 or the memory 14.

Rotary Data Register Stack

Figure 3:
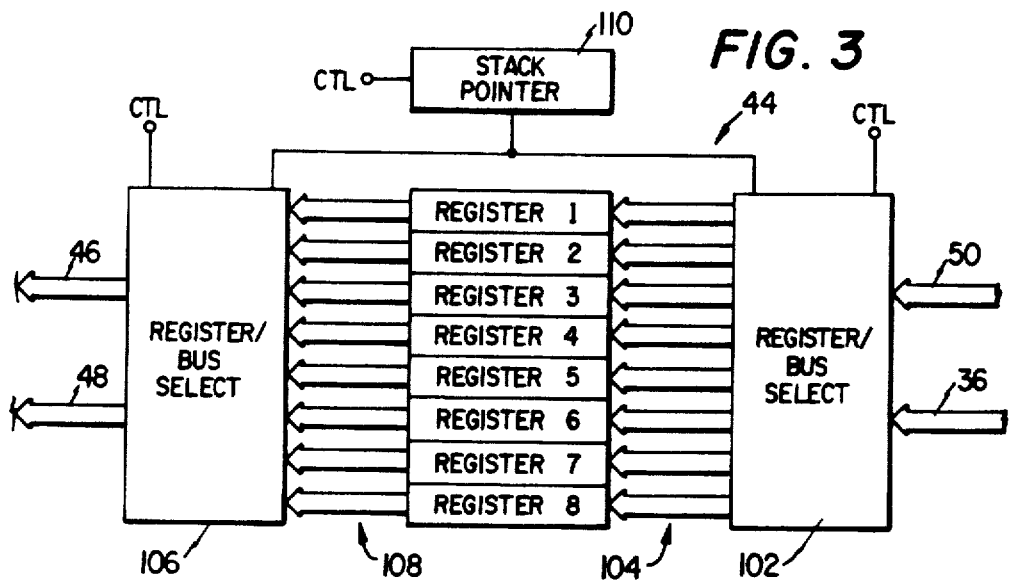
FIG. 3 illustrates an expanded block diagram of the rotary data register file.

Referring now to FIG. 3, there is illustrated an expanded diagram of the rotary data stack 44 of FIG. 2. The rotary stack 44 is comprised of eight sixteen-bit wide data registers labeled REGISTER 1 through REGISTER 8. A register/bus select 102 is interfaced with the input of REGISTER 1 through REGISTER 8 through input interface buses 104. A register/bus select 106 is interfaced with REGISTER 1 through REGISTER 8 through output interface buses 108. The register/bus select 102 is operable to interface with the interface bus 36 and the input data bus 50 to transfer information contained thereon to a select one of the data registers REGISTER 1 through REGISTER 8. The register/bus select 106 interfaces with the data output buses 46 and 48 to transfer data from select ones of the data registers REGISTER 1 through REGISTER 8. It should be understood that both buses 36 and 50 can be simultaneously connected to the same data register or to two separate registers at the same time and that the output data buses 46 and 48 can receive data from the same data register or from two separate data registers at the same time.

A stack pointer 110 is connected to both of the register/bus selects 102 and 106 to determine which of the data registers REGISTERS 1 through REGISTERS 8 is the top priority register in the stack. Rather than designate REGISTER 1 as the top priority stack and shift the data each time data is placed in or out of the stack, the pointer is merely incremented to the appropriate register. If for example, REGISTER 4 is designated as the top priority register and data is to be output from the second priority register, the register/bus select 106 selects REGISTER 3 as the output register and places the data thereon onto the appropriate one of the output data buses 46 or 48. If, however, data is pushed onto the stack, the stack pointer 110 will be incremented and the data will be placed into REGISTER 5 through selection by the register/bus select 102. When this data is pushed onto the stack, the data in the lowest priority register, which is REGISTER 5, must be stored in the overflow stack 76 prior to incrementing the stack pointer 110.

To effect transfer of data from the lowest priority register in the stack 44 to the overflow stack 76, the register/bus select 106 connects the output of REGISTER 5 to the output data bus 46 and the transfer gate 52 is activated to connect the output data bus 46 to the input data bus 50. As will be described hereinbelow, in one operation, or one clock cycle, the output data is clocked into the overflow stack, the stack pointer 110 is incremented and data from the interface bus 36 is input to REGISTER 5 with REGISTER 5 now being the top priority data register in the rotary stack 44. Therefore, the rotary stack 44 and the overflow stack 76 provide a relatively deep stack with the top eight data registers thereof simultaneously addressable.

Figure 4:
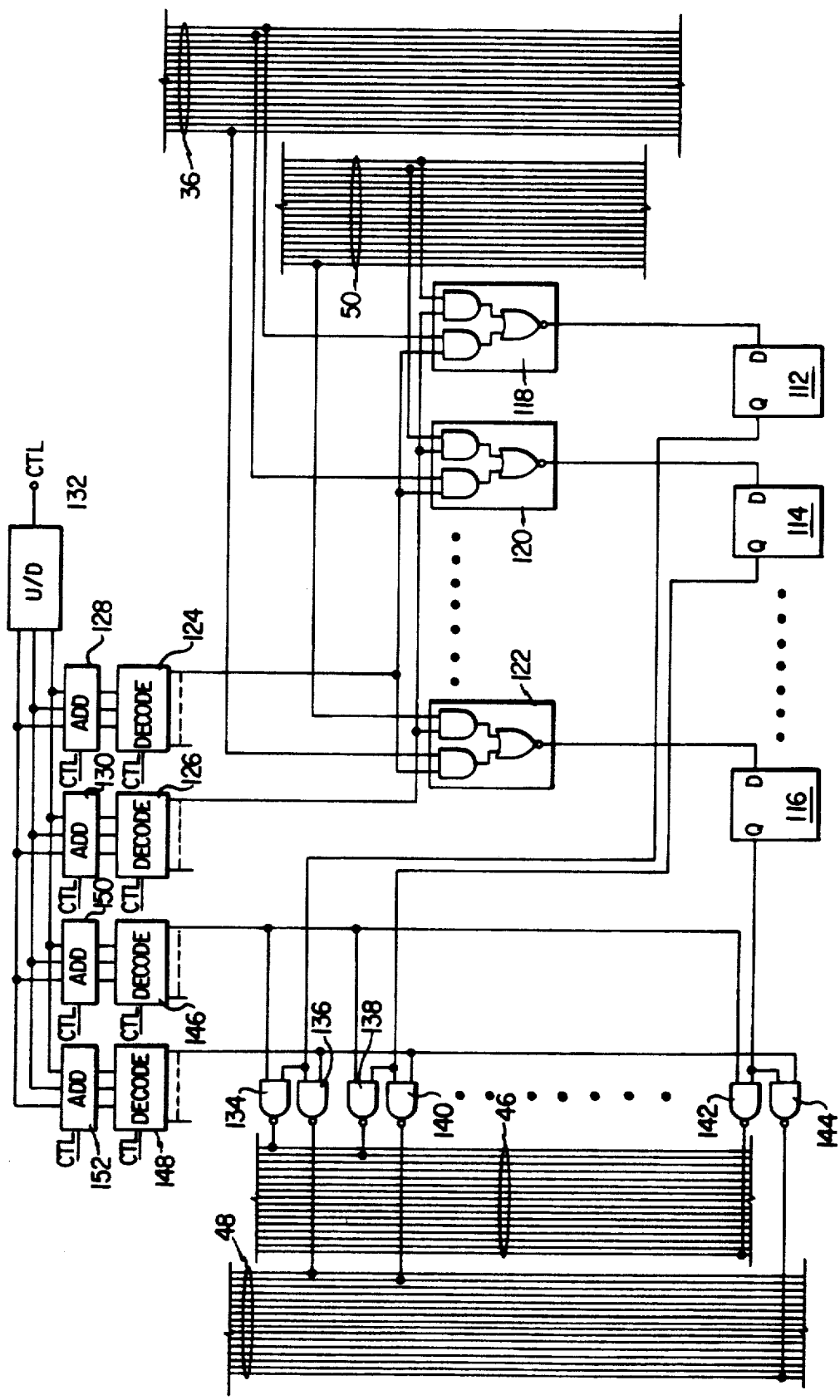
FIG. 4 illustrates a schematic diagram for one register in the rotary data register file.

Referring now to FIG. 4, there is illustrated a schematic diagram for REGISTER 1 of the rotary stack 44 of FIG. 3. The interface bus 36, the data input bus 50 and the output data buses 46 and 48 are sixteen-bit wide buses of which only the connections are illustrated for simplicity purposes. REGISTER 1 is comprised of sixteen D-type flip flops, of which only the first two, corresponding to Bit-0 and Bit-1, and the last, corresponding to Bit-15 are illustrated. Bit-0 corresponds to a D-type flip flop 112, Bit-1 corresponds to a D-type flip flop 114 and Bit-15 corresponds to a D-type flip flop 116 with a dotted line therebetween representing the remaining flip flops in REGISTER 1. An AND/OR invert gate 118 has the output thereof connected to the D input of the flip flop 112, an AND/OR invert gate 120 has the output thereof connected to the D input of the flip flop 114 and an AND/OR invert gate 122 has the output thereof connected to the D input of the flip flop 116. Corresponding AND/OR invert gates are connected to the flip flops (not shown) representing Bits 2-14.

One of the inputs of one of the AND gates in the gate 118 is connected to Bit-1 of the bus 50 and one of the inputs of the remaining AND gate therein is connected to Bit-1 of the bus 36. In a similar manner, one input of one of the AND gates in the gate 120 is connected to Bit-2 of the bus 50 and one of the inputs of the remaining AND gates therein is connected to Bit-2 of the bus 36. The gate 122 is also similarly connected with one input of the internal AND gates thereof connected to Bit-15 of bus 50 and one of the inputs of the remaining internal AND gates therein connected to Bit-15 of bus 36. In order to enable the respective bits from either the bus 36 or the bus 50 to appear on the output of the gates 118-122, enable signals are necessary for input to the corresponding AND inputs of the internal AND gates. These enable signals are provided by a 3-8 decoder 124 and a 3-8 decoder 126. The decoder 124 is operable to enable the gates 118-122 to transfer data from the interface bus 36 to the D inputs of flip flops 112-116 and the decoder 126 is operable to enable the gates 118-122 to transfer data from the input data bus 50 to the D inputs of the flip flops 112-116. Each of the decoders 124 and 126 has 8 outputs, each of which is connected to similar gates on the data registers REGISTER 1 through REGISTER 8.

A 3-Bit ADDER 128 has the output thereof connected to the input of the decoder 124. A 3-Bit ADDER 130 has the output thereof connected to the input of the decoder 126. The inputs of the ADDER's 128 and 130 are connected to the output of a 3-Bit up-down counter 132. The up-down counter 132 is controlled by the control word output from the control latch 68 to determine the highest priority one of the data registers REGISTER 1 through REGISTER 8. The ADDER's 128 and 130 are operable in response to microcode instructions to selectively shift the 3-Bit output of the up-down counter 132 to select a register of a different priority than the top of the stack. The decoders 124 and 126 then decode the 3-Bit words output by the ADDER's 128 and 130, respectively, to select the appropriate register. Since it is not necessary to utilize buses 36 and 50 in all primitive executions, the decoders 124-126 have an enable input that is also connected to the output of the control latch 74. This enable input can be controlled to effectively disconnect either or both of the buses 36 and 50 from the input of the data registers in the stack 44.

The Q output of the register 112 is connected to one input of a NAND gate 134 and one input of a NAND gate 136. The output of the NAND gate 134 is connected to Bit-0 of the output bus 46 and the output of the NAND gate 136 is connected to Bit-0 of the output bus 48. The Q output of the flip flop 114 is connected to one input of a NAND gate 138 and one input of a NAND gate 140. The output of the NAND gate 138 is connected to Bit-1 of the output bus 46 and the output of the NAND gate 140 is connected to Bit-0 of the output bus 48. The Q output of the flip flop 116 is connected to one input of a NAND gate 142 and one input of a NAND gate 144. The output of the NAND gate 142 is connected to Bit-15 of the output bus 46 and the output of the NAND gate 144 is connected to Bit-15 of the output bus 48.

A 3-8 decoder 146 has Bit-0 thereof connected to the other inputs of NAND gates 134, 138 and 142 and a 3-8 decoder 148 has Bit-0 thereof connected to the other inputs of the NAND gates 136, 140 and 144. The 3-8 decoder 146 is functional to select the output data bus 46 and the 3-8 decoder 148 is functional to select the output data bus 48. A 3-Bit ADDER 150 has the input thereof connected to the output of the up-down counter 132 and the output thereof connected to the input of the decoder 146. A 3-bit ADDER 152 has the input thereof connected to the output of the up-down counter 132 and the output thereof connected to the input of the decoder 148. The ADDER's 150 and 152 in combination with the decoders 146 and 148, respectively, operate in a similar fashion to the ADDER's 128 and 130 and the decoders 124 and 126.

In operation, the up-down counter 132 is shifted to a position such that the 3-Bit output is representative of the highest priority data register of the data registers REGISTER 1 through REGISTER 8. If data is to be input from the interface bus 36 to the data register having second priority, then decoder 124 is enabled and instructions are provided to the ADDER 128 to shift the output of the up-down counter 132 by one. This effectively shifts the register select by one. If the execution requires input of data from the input data bus 50 simultaneous with data from the interface bus 36, the decoder 126 is also enabled and an appropriate signal provided to the ADDER 130 to select the desired register with respect to the top of the stack. Selection of the desired output bus by the decoders 146 and 148 and the ADDER's 150 and 152 is effected in a similar manner.

Figure 5:
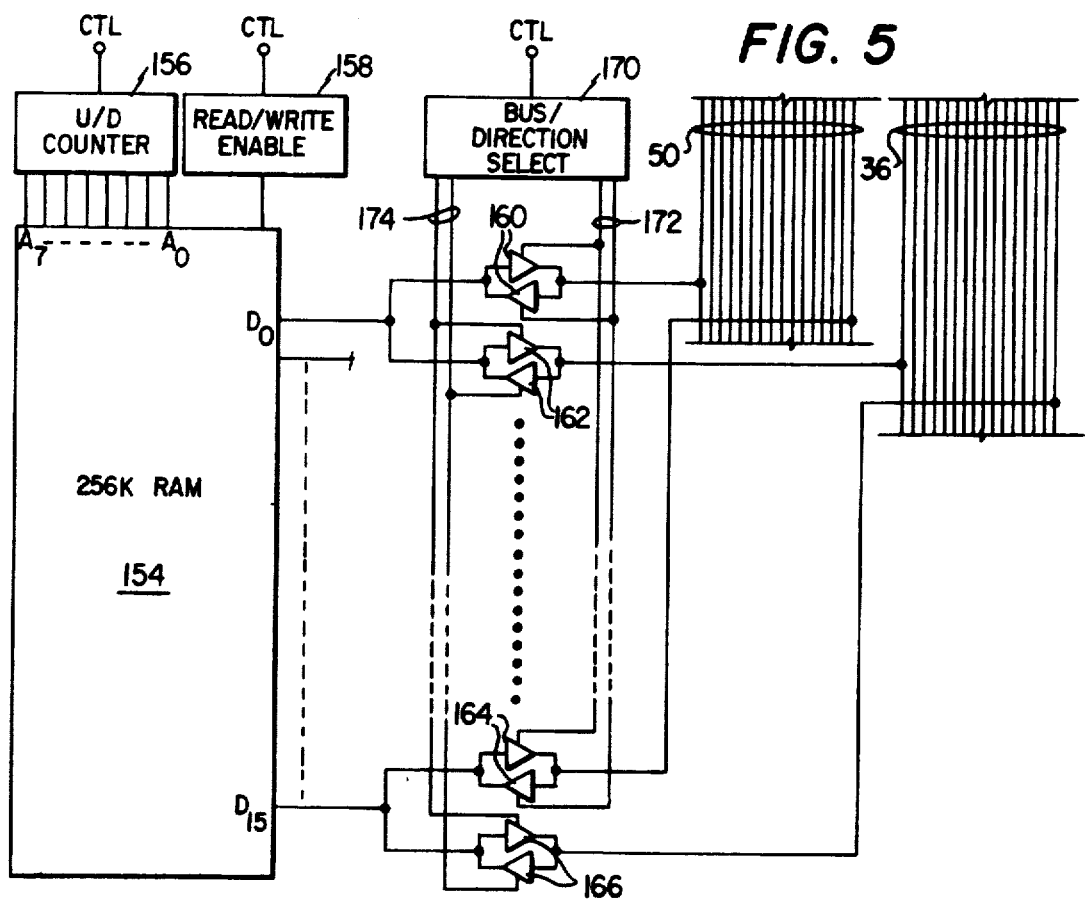
FIG. 5 illustrates a schematic block diagram of the overflow data register.

Referring now to FIG. 5, there is illustrated a schematic diagram of the overflow stack 76. A random access memory (RAM) 154 is provided as a storage medium having a capacity of 256K. The RAM 154 provides both a Read and Write capability and is addressable through an 8-Bit address input to read or write data out of a 16-Bit data port. An 8-Bit up-down counter 156 has the output thereof connected to the address input AO-A7 of the RAM 154 with the input thereof controlled by the microcode instruction on the output of the control latch 68. The up-down counter 156 is operated synchronously with the up-down counter 132 that controls the stack pointer and the rotary register 44 such that loading of data into the rotary stack 44 causes the lowest priority data therein to be loaded into the RAM 154. A Read/Write enable circuit 158 is connected to the RAM 154 to determine whether data is to be read from the output port thereof or stored therein. The Read/Write enable 158 is controlled by the microcode instruction output from the control latch 68.

A bidirectional bus transceiver 160 has one port thereof connected to Bit-0 of the input data bus 50 and the other port thereof connected to the DO input of the RAM 154. A bidirectional bus transceiver 164 has one port thereof connected to Bit-0 of the interface bus 36 and the other port thereof connected to the DO input of the RAM 154. A bidirectional bus transceiver 162 has one port thereof connected to Bit-15 of the input data bus 50 and the other port thereof connected to D15 of the RAM 154. A bidirectional bus transceiver 166 has one port thereof connected to Bit-15 of the interface bus 36 and the other port thereof connected to the D15 of the RAM 154. The bus transceivers 160-166 are bidirectional gates having three state outputs to provide individual selection between the input data bus 50 and the interface bus 36 and also the direction of data flow to the RAM 154. The transceivers 160 and 162 are associated with the data input DO and the transceivers 164 and 166 are associated with the data input D15. Similar associated transceivers are connected between the input data bus 50 and the interface bus 36 and the D1-D14 data inputs of the RAM 154.

A bus/direction select 170 has four control lines output therefrom and connected to the transceivers 160-166. Two control lines 172 of the four control lines control the transceivers 160 and 164 which are operable to connect the RAM 154 with the input data bus 50. Two control lines 174 of the four control lines are connected to the transceivers 162 and 166 which are operable to connect the data input of the RAM 154 with the interface bus 36. Depending upon the logic state on the control lines 172 and 174, data will flow from either of the buses 36 and 50 to the RAM 154, from the RAM 154 to either of the buses 36 and 50 or data flow will be inhibited.

System Operation

In operation, the system is first initiated at the third level of operation or the main program and then threaded down to the primitive level. Usually this involves addressing one program step in the main program which transfers operation of the system to one of the threaded lists stored in the ROM/RAM 80. This list is executed and then the program returned to the next step of the main program. In executing the threaded list, each address therein is placed onto the I/O bus 10 and a given primitive corresponding to that address executed in a sequential manner. At the end of the threaded list, a return instruction sets up all of the transfer gates to allow the system to return to the main program. Although only three levels of operation will be described, it should be understood that a number of "threads" can be disposed between the main program and the primitive level.

In the preferred embodiment, primitives are predefined in terms of the control word that is output by the control latch 68. As described above, this control word sets up the data flow paths on the various buses in the threaded interpretive processor. By selecting the appropriate address for a desired primitive, the threaded interpretive processor executes that primitive within a predetermined number of clock cycles. For the most part, all primitives are executed in one clock cycle. However, some primitives such as those involving multiplication operations by the ALU 16 require two to four clock cycles to provide sufficient time for the operation. If the desired operation to be performed is not predefined as a primitive, a number of primitives will have to be executed as a threaded list on the second level of operation in order to perform the desired operation. Since this requires a number of clock cycles, it is desirable to predefine as many primitives as possible in order to increase execution speed in the threaded interpretive processor.

In the preferred embodiment, the primitive instructions that are utilized are illustrated in Table 1. In Table 1, "p" refers to an argument that is stored in any one of the data registers in the rotary stack 44 data registers REGISTER 1 through REGISTER 8. The priority of the arguments is referred to as "p1, p2, p3, . . . ." with "p1" referring to the argument in the highest priority one of the data registers REGISTER 1 through REGISTER 8. The reference letter "f" refers to a flag which is essentially a data word in which only one bit is relevant. An explanation of these terms can be found in Leo Brody, *Starting Forth*, 1981.

TABLE 1

| PRIMITIVE INSTRUCTIONS | | |
|---|---|---|
| + | (p1 p2 -- sum) | Adds |
| − | (p1 p2 -- diff) | Subtracts (p1 − p2) |
| * | (p1 p2 -- prod) | Multiplies |
| / | (p1 p2 -- quot) | Divides (p1/p2) |
| 1+ | (p -- p + 1) | Adds one |
| 1− | (p -- p − 1) | Subtracts one |
| 2+ | (p -- p + 2) | Adds two |
| 2− | (p -- p − 2) | Subtracts two |
| 2* | (p -- p*2) | Multiplies by two |

TABLE 1-continued
PRIMITIVE INSTRUCTIONS

| | | |
|---|---|---|
| 2/ | (p -- p/2) | (left shift) Divides by two (right shift) |
| Negate | (p -- p) | Two's compliment |
| = | (p1 p2 -- f) | True if p1 equals p2 |
| < | (p1 p2 -- f) | True if p1 less than p2 |
| > | (p1 p2 -- f) | True if p1 greater than p2 |
| 0= | (p -- f) | True if zero |
| 0< | (p -- f) | True if negative |
| 0> | (p -- f) | True if positive |
| U< | (p1 p2 -- f) | True if unsigned p1 is less than p2 |
| AND | (p1 p2 -- and) | Logical AND |
| OR | (p1 p2 -- or) | Logical OR |
| XOR | (p1 p1 -- exor) | Exclusive OR |
| ! | (p adr -- ) | Moves p to addressed Memory |
| @ | (adr -- p) | Moves addressed Memory to p |
| C! | (padr -- ) | Moves character to Memory |
| C | (adr -- p) | Loads character from Memory |
| >R | (p -- ) | Moves Parameter stack value to return stack |
| R> | (-- p) | Moves return stack value to parameter stack |
| I | (-- p) | Copies top of return stack |
| I' | (-- p) | Copies second item in return stack |
| J | (-- p) | Copies 3rd item in return stack |
| SWAP | (p1 p2 -- p2 p1) | Exchanges top two stack items |
| DUP | (p -- pp) | Duplicates top of stack |
| OVER | (p1 p2 -- p1p2p1) | Pushes copy of second item on top of stack |
| ROT | (p1p2p3 -- p2p3p1) | Rotates the third item to the top of stack |
| DROP | (p -- ) | Discards the top stack item |

Figure 6:
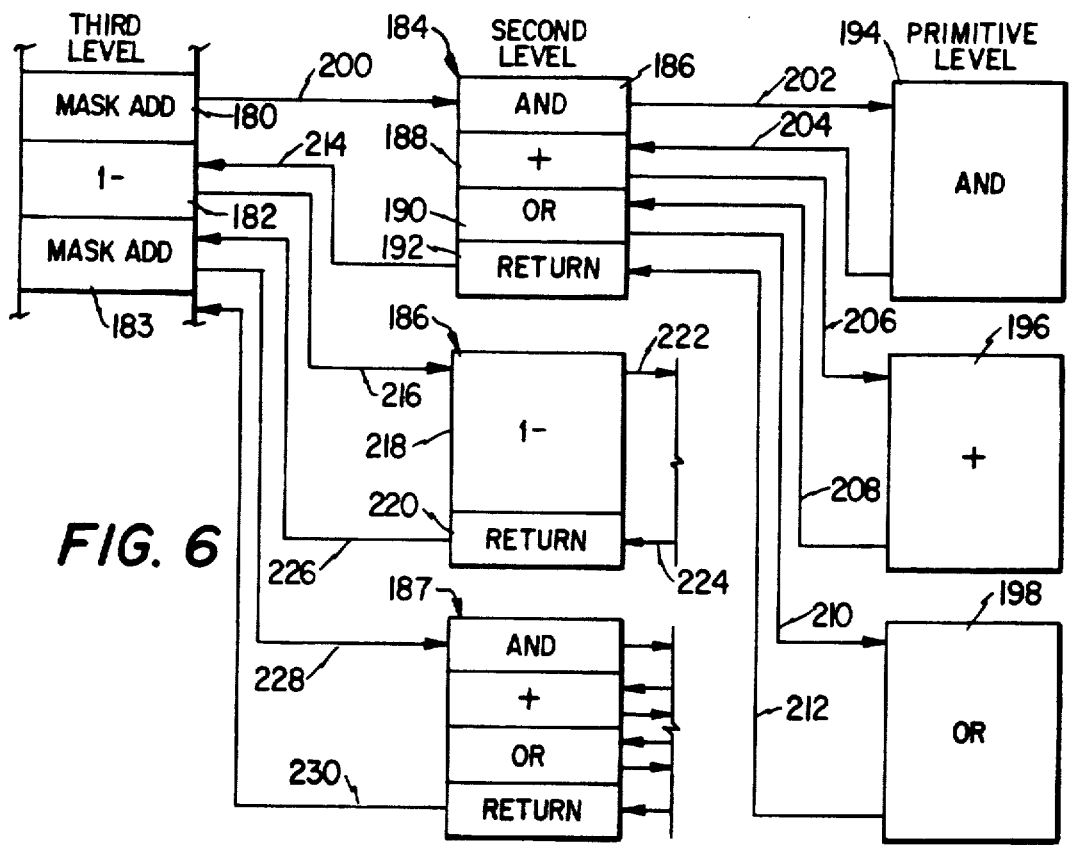
FIG. 6 illustrates a flow diagram for three levels of operation of the threaded interpretive processor.

Referring now to FIG. 6, there is illustrated a flow diagram for a program illustrating three steps of a third level main program, the associated threaded lists for the second level of operation and the primitive level of operation for one of the threaded lists. The portion of the main program in the third level of operation as illustrated is comprised of a program step 180 labeled MASK ADD, a program step 182 labeled "1-" and a program step 183 labeled MASK ADD. The program steps 180-183 represent address locations in either the ROM/RAM 80 or the memory 14. Each of these third level address locations for the main program has stored therein the second level address for the particular function to be performed. In the present example, all of the addresses in the steps 180-183 correspond to the initial second level address of the threaded lists in the second level of operation. The MASK ADD step 180 flows to an associated threaded list 184, the "1-" program step 182 flows to an associated threaded list 186 and the MASK ADD program step 183 flows to an associated threaded list 187.

In the main program, the MASK ADD program steps 180 and 183 represent a function that is performed by the threaded list 184 and 187, respectively. In actuality, both of the threaded lists 184 and 187 occupy the same memory since they are the same function or subroutine. Therefore, each of the second level address locations contained in the program steps 180 and 183 contain the same data—the initial address of the MASK ADD threaded list. The function provided by the MASK ADD program step is to mask off a portion of a given word, add this masked word with another argument and OR the results with an ornament word. This is accomplished by generating an Argument A that has eight bits at a logic one state and eight bits at a logic zero state. When a logic AND function is performed on Argument A and any other argument such as Argument B, only the first half of Argument B is output to provide the masked word. This result is then added to an Argument C and the result of this addition is then combined with an ornament word by a logical OR operation. The ornament can be a logical one in any one of the masked off bits for purposes such as recognition at a later time.

Essentially, there are four Arguments, Argument A, Argument B, Argument C and Argument D, that are pushed into the rotary stack 44 to occupy the top four data registers therein. Once loaded, the program threads its way down from the program step 180 to the threaded list 184. The threaded list 184 has a program step 186 labeled AND, a program step 188 labeled "+", a program step 190 labeled OR and a program step 192 labeled RETURN. During execution of each of the program steps in the threaded list 184, the program flows to the primitive level of execution and then back to the next sequential program step in the second level of execution. The AND program step 186 flows to a primitive level program 194 labeled AND, the "+" program step 188 flows to a primitive level program 196 labeled "+" and the OR program step 190 flows to a primitive level program 198 labeled OR. For simplicity purposes, the primitive level programs for the threaded lists 186 and 187 are not illustrated. However, the primitive level program steps 194, 196 and 198 are utilized by the threaded list 187 since it is identical to the threaded list 184.

During execution of the threaded list 184, the MASK ADD operation manipulates data in the data registers REGISTER 1 through REGISTER 8 with only data in the top four priority registers operated upon. The operation of MASK ADD is illustrated in Table 2 where DR1 is the top priority register with DR2-DR4 being data registers of decreasing priority. Arg A through Arg D are the Arguments operated upon with Arg A being the masking word and Arg D being the ornament.

TABLE 2

| Operation | DR1 | DR2 | DR3 | DR4 |
|---|---|---|---|---|
| Load Data | Arg A | ArgB | ArgC | ArgD |
| AND | Arg A Arg B | ArgC | ArgD | * |
| + | (Arg A Arg B) + Arg C | ArgD | * | * |
| OR | [(Arg A Arg B) + Arg C] <or> Arg D | * | * | * |

Referring now to FIGS. 2 and 6, the operation of the three-step third level program of FIG. 6 will be described in detail. For this example, the addresses referring to primitive instructions are allocated to addresses between 0 to 64, addresses for program steps in the threaded lists of the second level of operation are allocated to address locations between 65 and 512 and program steps in the main program or third level of operations are allocated to memory locations from 513 upwards.

In order to address the program step 180 in the third level of operation, it is first necessary to place the third level address of this program step onto the I/O bus 10. In addition, the transfer gates 82 and 84 are appropriately set to select one of the memories 14 or 80 which contains this address. The decoder 92 determines that this third level address is a high level operation and, as such, loads the address into the incrementing register and increments this address by one. The decoder 92 also controls the instruction pointer 86 to load the third level address therein. On the next clock cycle, the incremented third level address stored in the register 94 is stored in the return stack 20 and the third level address that was previously loaded in the instruction pointer 86 clocked through to the address bus 12. When the third level address appears on the address bus 12, the data contained at this third level address is placed onto the I/O bus 10 from the connected one of the memories 14 or 80. In addition to clocking the contents of the instruction pointer 86 onto the address bus 12, the contents of the instruction register 58 are clocked through to the address decoder 62. As described above, this results in a functional control word output from the control latch 68 since the address is that of a high level step with an address greater than 64. This control word sets up the various transfer gates to receive the next instruction.

The data contained at the third level address for the program step 180 is the initial second level address of the MASK ADD threaded list 184, which is the next instruction. This second level address is placed onto the I/O bus 10 and decoded by the decoder 92 as being a second level threaded list address. As described above, this initial address is loaded into the instruction pointer 86 and also into the instruction register 58 without loading the incrementing register 94 and incrementing the address therein.

On the next clock cycle, the second level address in the instruction register 58 is clocked through to the address decoder 62 and the second level address in the instruction pointer 86 is clocked through to the address bus 12. This step is represented by a flow line 200. Since the second level address is that of a high level instruction, a functional control word is output by the control latch 68. This functional control word is operable to set the transfer gates 82 and 84 to determine from which memory the microcode address for the AND instruction is to be received. The second level address on the address bus 12 retrieves the AND microcode address from the select one of the memories 14 or 80 and places it onto the I/O bus 10. This step is represented by a flow line 202.

The microcode address placed onto the I/O bus 10 in the program step 186 is an address for the microcode RAM 60. The decoder 92 recognizes that this is the address of a primitive and not the initial address of a threaded list and increments the contents of the instruction pointer 86 rather than loading the microcode address therein. The instruction pointer 86 is now loaded with the second level address for the program step 188 in the threaded list 184. In addition to incrementing the contents of the instruction register 86, the instruction register 58 is loaded with the microcode address on the I/O bus 10.

On the next clock cycle, the contents of the instruction register 58 are clocked through to the address decoder 62 to address the microcode ROM 60. Since this is a primitive address, a primitive control word is output by the latch 68 to set the appropriate transfer gates in the rotary stack 44 to perform the desired function. Since this is the address of an AND function, the transfer gates 54 and 56 on the input of the ALU 16 are activated and the first and second data registers in the rotary stack 44 are placed onto the output data buses 46 and 48. The output of the ALU 16 is interfaced with the second data register in the rotary stack 44 through the transfer gate 32 and the interface bus 36. In this manner, DR1 and Argument B in data register DR2 have a logic AND performed thereon and the result of this operation is presented to the input of the stack 44.

At the same time that the microcode address is clocked through the instruction register 58, the incremented second level address in the instruction pointer 86 is clocked onto the address bus 12. This incremented second level address represents the address for the program step 188 which contains the microcode address for the "+" primitive. To place the microcode address onto the I/O bus 10, one of the transfer gates 82 or 84 must be activated. These transfer gates are controlled by the control word output by the control latch 68. Since a primitive address is always followed by an address from memory, except for the special case of the RETURN instruction, as will be described hereinbelow, one of the transfer gates 82 or 84 will always be activated. Therefore, execution of a given primitive instruction is paralleled with the fetching of the next sequential address in a given threaded list. This step is represented by the flow line 204 from the AND primitive level program 194 to the "+" program step 188.

On the next clock cycle, the data output by the ALU 16 is input to the second priority data register and the stack pointer is incremented such that the second priority data register now becomes the first priority data register. Therefore, the top register in the rotary stack 44 has stored therein the result of performing a logical AND on Argument A and Argument B. In addition, the top element in the overflow stack 76 is placed into the lowest priority register.

As the data from the ALU 16 is placed into the rotary stack 44, the decoder 92 increments the instruction pointer 86 to the second level address for the program step 190 and the microcode address in the instruction register 58 is clocked through to the address decoder 62 to address the microcode ROM 60 to output the primitive control word for the "+" program step 196. The microcode address causes a control word to be output from the control latch 68 that connects the first and second priority registers DR1 and DR2 in the rotary stack 44 to the output buses 46 and 48 and activates the transfer gates 54 and 56 to input this data to the ALU 16. The ALU 16 is also controlled to perform an addition operation and place the output therefrom onto the interface bus 36 through the transfer gate 32. The interface bus 36 is interfaced with the second priority data register in the rotary stack 44 to be input thereto on the next clock cycle.

During the same clock cycle, the second level address for the OR program step 190 has been placed onto the address bus 12 and the microcode address contained at that second level address is fetched and placed on the I/O bus 10. This is represented by a flow line 208. This microcode address addresses the microcode ROM 60 to output a control word corresponding to the logical OR function. The decoder 92 detects the presence of a microcode address on the I/O bus 10 and increments the instruction pointer 86 to the next sequential second level address for the program step 192. In addition, the instruction register 58 is loaded with the microcode address for the logical OR function.

On the next clock cycle, the microcode address in the instruction register 58 is blocked through to the address decoder 62 to address the microcode ROM 60 to output the control word corresponding to the logical OR function. This is represented by a flow line 210. This control word is operable to connect the top two priority registers DR1 and DR2 in the rotary stack 44 to the input of the ALU 16 to perform a logical OR function thereon and place the results therefrom onto the interface bus 36. The interface bus 36 is interfaced with the second priority data register of the rotary stack 44.

During the same clock cycle, the incremented second level address of the instruction pointer 86 is placed onto the address bus 12 to address the data register corresponding to the program step 192. This data register has contained therein the microcode address for the RETURN instruction. This microcode address is placed onto the I/O bus 10 and loaded into the instruction register 58. Simultaneous with this, the decoder 92 detects that this is a microcode address and increments the contents of the instruction pointer 86. This is represented by a flow line 212. Since the program step 192 is the last program step in the threaded list 184, the incremented address in the instruction pointer 186 will not be utilized, as will be described hereinbelow.

On the next clock cycle, the microcode address for the RETURN instructions in the instruction register 58 is clocked through to the address decoder 62 to output the control word for the RETURN instruction from the control latch 68. In addition, the incremented second level address in the instruction pointer 86 is placed onto the address bus 12. However, the RETURN instruction deactivates both of the transfer gates 82 and 84 to prevent data output by either of the memories 14 or 80 from being placed on the I/O bus 10. The RETURN control word pops the return stack 20 through the transfer gate 98 to output the incremented third level address for the third level of operation, which corresponds to the program step 182. This third level address is loaded into the instruction register 58 and the decoder 92 determines that this address is that of a third level operation and loads this third level address into the instruction pointer 86. This is represented by a flow line 214 from the RETURN program step 192 to the program step 182 in the main program.

When the contents of the instruction pointer 86 consisting of the third level address for the program step 182 are clocked through to the address bus 12, the contents of the data register corresponding to the third level address of program step 182 are placed on the I/O bus 10. This is the initial second level address of the threaded list 186 and this step is represented by a flow line 216. The threaded list 186 consists of a program step 218 that is the primitive "1-" and a RETURN program step 220. The decoder 92 detects the presence of the second level address on the I/O bus 10 and also detects that this is the initial address of the threaded list 186. Therefore, the second level address is loaded into the instruction register 58 and also into the instruction pointer 86.

On the next clock cycle, the second level address in the instruction register 58 is loaded into the address decoder 62 and the second level address in the instruction pointer 86 is loaded onto the address bus 12. The address decoder 62 decodes the address as being that of a high level instruction and outputs the appropriate functional control word to activate either the transfer gate 82 or the transfer gate 84 to interface one of the memories 14 or 80 with the I/O bus 10. When the initial address of the program step 218 is placed onto the address bus 12, the microcode address for the primitive "1-" is fetched from memory and placed onto the I/O bus 10. This is indicated by a flow line 222.

After the primitive has been executed, the program returns along a flow line 224. As described above, this takes only one clock cycle to clock through the primitive second level address, increment the instruction pointer 86 and place the second level address for the program step 220 onto the address bus 12. This second level address is that of a RETURN instruction which returns the program from the second level of operation to the program step 183 in the third level of operation along a flow line 226. As described above, when the RETURN microcode address is clocked through the instruction register 58, the control word output from the latch 68 is a functional control word that pops the return stack 20 which is the incremented third level address for the program step 183 in the third level of operation. The program then proceeds along a flow line 228 to the threaded list 188 and returns along a flow line 230 with the next sequential third level address placed on the I/O bus 10.

In executing the threaded list 184, it can be seen that the flow lines 202 and 204 represent one clock cycle, the flow lines 206 and 208 represent a second clock cycle and the flow lines 210 and 212 represent a third clock cycle. Therefore, it requires only three clock cycles to step through this threaded list to perform the desired function. An additional clock cycle is required to pop the return stack 20 and place the next sequential address for the third level of operation onto the I/O bus 10.

Masked Operating System

Figure 7:
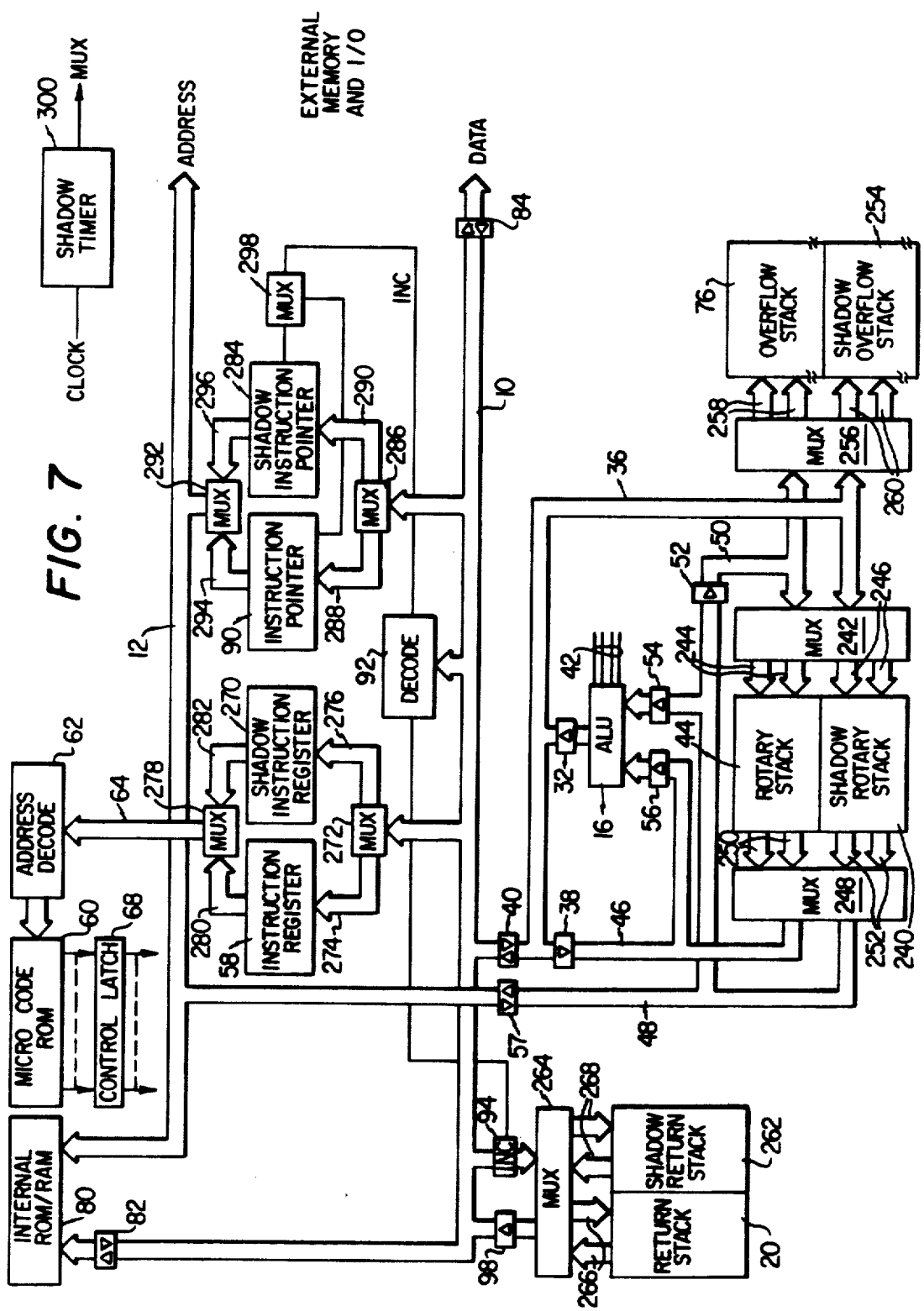
FIG. 7 illustrates an expanded block diagram of a masked threaded interpretive processor in accordance with the present invention.

Referring now to FIG. 7, there is illustrated a schematic block diagram of a masked operating system similar to the system of FIG. 2 with the addition of a masked operation that runs in parallel with the main system operation. A shadow rotary stack 240 is disposed in parallel with the rotary stack 44. The shadow rotary stack 240 is comprised of eight 16-Bit wide data registers that are identical to the data registers in the rotary stack 44. A multiplexer 242 has two inputs for interfacing with the interface bus 36 and the input data bus 50. The multiplexer 242 has a pair of output interface buses 244 for interfacing to the rotary stack 44 and a pair of output interface buses 246 for interfacing with the shadow rotary stack 240. The multiplexer 242 is operable to shift the buses 36 and 50 to either interface with the interface buses 244 or the interface buses 246. A multiplexer 248 is disposed on the output of the rotary stack 44 and the shadow rotary stack 240 and has two outputs for interfacing with the output data buses 46 and 48. The rotary stack interfaces with the multiplexer 248 through a pair of input interface buses 250 and the shadow rotary stack 240 interfaces with the multiplexer 248 to a pair of input interface buses 252. The multiplexer 248 is operable to switch the input interface buses 250 or 252 to interface with the output data buses 46 and 48. The multiplexers 242 and 248 are controlled by a multiplex signal (MUX).

A shadow overflow stack 254 is disposed adjacent the overflow stack 76. A multiplexer 256 has two inputs thereof connected to the interface bus 36 and the input data bus 50, respectively. The multiplexer 256 has a pair of output interface buses 258 for interfacing with the overflow stack 76 and a pair of output interface buses 260 for interfacing with the shadow overflow stack 254. The multiplexer 256 is operable to switch the buses 36 and 50 to either of the pairs of output buses 258 or 260. The multiplexer 256 is controlled by the MUX signal.

A shadow return stack 262 is disposed parallel to the return stack 20. A multiplexer 264 has two inputs that interface with the incrementing register 94 and the transfer gate 98 for interfacing with the I/O bus 10. The multiplexer 264 has a pair of outputs that interface with the return stack 20 through output interface buses 266 and a pair of outputs that interface with the shadow return stack 262 through output interface buses 268. The multiplexer 264 is operable to input data from the incrementing register 94 to either the return stack 20 or the shadow return stack 262 or to pop the return stack 20 or the shadow return stack 262 to the I/O bus 10. The multiplexer 264 is controlled by the MUX signal.

A shadow instruction register 270 is disposed parallel to the instruction register 58. A multiplexer 272 has the input thereof interfaced with the I/O bus 10 and is operable to switch the I/O bus 10 between two outputs thereof. The first output thereof is interfaced with the instruction register 58 through an interface bus 274 and the other output thereof interfaced with the shadow instruction register 270 through an interface bus 276. A multiplexer 278 has the output thereof interfaced with the interface bus 64 and is operable to switch one of two inputs thereof to interface with the interface bus 64. The first input thereof is connected to the output of the instruction register 58 through an interface bus 280 and the other input thereof interfaced with the output of the shadow instruction register 270 through an interface bus 282. The multiplexers 272 and 278 are operable to interface either the instruction register 58 or the shadow instruction register 270 between the I/O bus 10 and the address decoder 62.

A shadow instruction pointer 284 is disposed in parallel to the instruction pointer 90. A multiplexer 286 has the input thereof interfaced with the I/O bus 10 and is operable to switch this input between two outputs. The first output thereof is interfaced with the instruction pointer 90 through an interface bus 288 and the other output thereof is interfaced with the shadow instruction pointer 284 through an interface bus 290. A multiplexer 292 has the output thereof interfaced with the address bus 12 and is operable to switch the output to either of two inputs thereof. The first input thereof is interfaced with the output of the instruction pointer 90 through an interface bus 294 and the other input thereof is interfaced with the output of the shadow instruction pointer 284 through an interface bus 296. The multiplexers 286 and 292 are operable to selectively interface either the instruction pointer 90 or the shadow instruction pointer 284 between the I/O bus 10 and the address bus 12.

The shadow instruction pointer 284 is identical to the instruction pointer 90 and both the shadow instruction pointer 284 and the instruction pointer 90 are operable to be loaded with data or have the data contained therein incremented before transferring the data to the output thereof. As described above, the decoder 92 provides the control signals for the incrementing or loading functions therein. The output of the decoder 92 is multiplexed by a multiplexer 298 that has two outputs, one of which is connected to the instruction pointer 90 increment input and the other of which is connected to the shadow instruction pointer 284 increment input. The multiplexer 298 is controlled by the MUX signal.

A shadow timer 300 is connected to the system clock 26 and is operable to generate the MUX signal on a periodic basis. In the preferred embodiment, the MUX signal is present for every tenth cycle of the clock 26. When the MUX signal is not present, the shadow rotary stack 240, the shadow overflow stack 254, the shadow return stack 262, the shadow instruction register 270 and the shadow instruction pointer 284 (hereinafter referred to as "shadow elements") are disconnected from the system and the system is connected identical to that illustrated in FIG. 2. For these nine cycles, system operation proceeds as described above. When the MUX signal is generated for the tenth clock cycle, system operation is transferred over to the shadow elements. For the one clock cycle that the shadow elements are connected, all operations for that clock cycle proceed as described above with reference to the diagram of FIG. 2. For example, the next shadow operation can be to step through the middle of a threaded list and execute one of the primitives defined therein. As described above, primitives are executed in a sequential manner with the microcode address for the primitive loaded into the instruction register 58 while the preceding primitive is being executed. When the MUX signal is generated, the shadow instruction register 270 is interfaced with the interface bus 64 and the information contained therein transferred to the address decoder 62. Since the information loaded in the shadow instruction register 270 is a microcode address for a primitive, a control word will be generated on the output of the control latch 68 to set the various transfer gates and control functions to execute the primitive.

The shadow instruction pointer 284 has the incremented second level address for the next step in the shadow threaded list stored therein. When the MUX signal is present, this second level address is clocked through the multiplexer 292 to the address bus 12 to address the next sequential data register in the threaded list and place the microcode address therein onto the I/O bus 10. As soon as the microcode address of the next primitive is placed onto the I/O bus 10, it is loaded into shadow instruction register 270 and the decoder 92 increments the shadow instruction pointer 284 through the multiplexer 298. Therefore, before the end of the clock cycle, the shadow instruction register 270 is loaded with the microcode address for the next primitive to be executed and the shadow instruction pointer 284 is incremented to request the next second level address in the shadow threaded list.

When the MUX signal is present, the multiplexers 242 and 248 interface the shadow rotary stack 240 with the input buses 36 and 50 and the output buses 46 and 48. The multiplexer 256 also interfaces the shadow overflow stack 254 with the buses 36 and 50. The shadow rotary stack 240 has its own independent stack pointer, which will be described hereinbelow, which operates independent of the rotary stack 44. By switching only the rotary stack data register and the overflow stack data registers, the transfer gates and the ALU 16 do not have to be repeated for shadow operation. The primitive instruction defined by the control word on the output of the control latch 68 is then executed with data in the shadow rotary stack 240 in a manner similar to that described above with reference to FIG. 6.

The shadow return stack 262 is also interfaced with the incrementing data register 94 and the transfer gate 98 when the MUX signal is present. As described above, the shadow return stack 262 is utilized to store addresses for the third level of operation such that this address can be popped off of the stack when returning from a lower level of operation. The shadow return stack has its own independent stack pointer and is identical to the return stack 20. By providing the shadow elements, an independent shadow program can be run in parallel with the main program. This independent shadow program runs at a slower speed since it only operates in one cycle out of ten, whereas the main program operates for nine cycles out of ten. Since the shadow timer 300 is a hardware timer, there is no possibility for the main program to enter an operating mode such that operation will not return to the shadow program. As such, the shadow program operates completely independent of the main program, thus providing the ability to monitor the operation of the main program or the system or detect any intrusion attempts that may be initiated external to the system. The shadow elements essentially eliminate the need for interrupts that require interface with the main program to operate properly.

Figure 8:
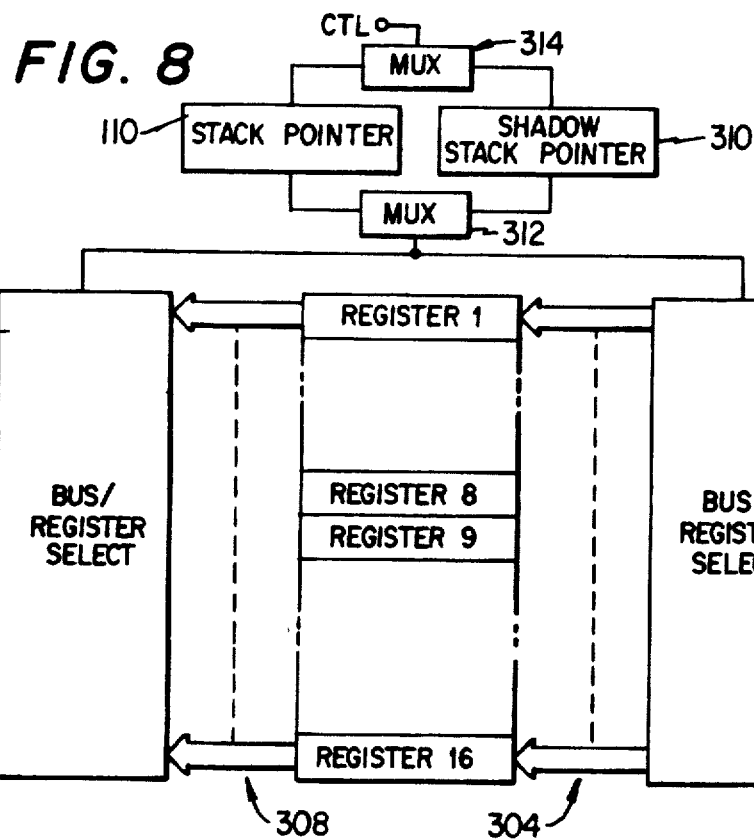
FIG. 8 is an expanded block diagram of the rotary stack for the masked threaded interpretive processor.

Referring now to FIG. 8, there is illustrated an expanded block diagram of the rotary stack 44 and the shadow rotary stack 240. The rotary stack 44, as described above, is made up of eight data registers labeled REGISTER 1 through REGISTER 8. The shadow rotary stack 240 is identical to the rotary stack 44 and has eight data registers formed therein labeled REGISTER 9 through REGISTER 16. Therefore, one stack of 16 registers forms both the rotary stack 44 and the shadow rotary stack 240.

A bus/register select 302 interfaces with the input data bus 50 and the interface data bus 36 and provides a plurality of outputs therefor that interface with REGISTER 1 through REGISTER 16 through a plurality of input interface buses 304. A bus/register select 306 interfaces on the output thereof with the output data bus 46 and the output data bus 48 and has a plurality of inputs therefor that interface with the outputs of REGISTER 1 through REGISTER 16 through a plurality of interface buses 308. The stack pointer 110 is multiplexed with a shadow stack pointer 310 through a multiplexer 312 to provide the control signals for the bus/register selects 302 and 306. A MUX signal controls the operation of the multiplexer 312. The bus/register selects 302 and 306 and the data registers REGISTER 1 through REGISTER 16 represent the rotary stack 44, the shadow rotary stack 240 and the multiplexers 242 and 248.

The operation of the bus/register selects 302 and 306 is identical to the operation of the bus/register selects 102 and 106 of FIG. 3. The stack pointer 110 and the shadow stack pointer 310 are latched up/down counters that have the control signal thereto multiplexed through a multiplexer 312. Both the stack pointer 110 and the shadow stack pointer 310 are 3-Bit up/down counters with the stack pointer 310 providing a fourth bit that is always at a logic high state. By providing this logic high state for the fourth bit on the shadow stack pointer 310, REGISTER 9 through REGISTER 16 will always be addressed with the stack pointer 110 restricted to REGISTER 1 through REGISTER 8.

Depending upon the multiplexer connections 312 and 314, the stack pointer 110 or the stack pointer 310 will be incremented to select the appropriate one of the associated data registers to be the highest priority data register. When the multiplexer removes the control signal therefrom, the data will remain latched therein until another incrementing control signal is presented thereto. The operation of the rotary stack 44 and the shadow rotary stack 240 is identical to that described in reference to FIG. 4 with the addition of 4-16 decoders rather than 3-8 decoders. The shadow overflow stack 254 and the shadow return stack 262 operate similar to the overflow stack 76 described above with reference to FIG. 5. An additional up/down counter 156 is added with an additional bit of data for addressing a second 256K of memory that is added in parallel to the RAM 154. In this manner, the bus direction select 170 with the associated transfer gates does not have to be repeated.

In the preferred embodiment, the various components that are utilized are as follows:

| Description | Ref. No. | Part No. | Manufacturer |
| --- | --- | --- | --- |
| Line Driver | 32, 38, 52, 56 | 74LS244 | Texas Instruments |
| ALU | 16 | 74LS181 | Texas Instruments |
| Transceiver | 40, 41, 82, 84, 160, 162, 164, 166 | 74LS243 | Texas Instruments |
| Flip Flop | 112, 114, 116 | 7474 | Texas Instruments |
| AND/OR | 118, 120, 122 | 7451 | Texas Instruments |
| 3-8 Decoder | 124, 126, 146, 148 | 74LS138 | Texas Instruments |
| 3-Bit Adder | 128, 130, 150, 152 | 74283 | Texas Instruments |
| 3 U/D Counter | 132, 156 | 74S169 | Texas Instruments |
| NAND gate | 134, 136, 138, 140, 142, 144 | 7401 | Texas Instruments |

In summary, there has been provided a threaded interpretive processor that implements the parameter stack operation in hardware such that they can be performed within one clock cycle of the system clock. In addition, a number of the threaded instructions are also implemented in hardware such that they can be sequentially executed without requiring numerous fetching instructions to memory. A rotary stack is utilized for the parameter stack with a plurality of data buses connected to the output and the inputs thereof. By selecting one or more of the outputs from the data registers in the rotary stack and controlling the data flow therefrom, the stack can effectively be manipulated. To perform arithmetic and logic functions on this data, an arithmetic logic unit is provided. All of the operations of the rotary stack are controlled by microcode instructions that are output in response to addresses sequentially placed onto an address bus. These microcode instructions enable a primitive level of instruction to be executed on each clock cycle. Internal and external memory is provided for storing program addresses for the microcode instructions.

Although the preferred embodiment has been described in detail, it should be understood that various changes, substitutions and alterations can be made therein without departing from the spirit and scope of the invention as defined by the appended Claims.

What is claimed is:

1. A signal processor, comprising:

a main signal bus for transmittal of data and program instructions therein;

a plurality of data registers configured as a stack and coupled to said signal bus for storing data;

steering means for selectively interconnecting the outputs of said data registers with the inputs thereof and the inputs and outputs of said data registers with said signal bus, such that any of the inputs or outputs of said data registers can be simultaneously interfaced with said signal bus or selected outputs of said data registers may be simultaneously interfaced with selected inputs thereof;

microcode storage means for storing microcode instructions at predetermined address locations therein, said microcode instructions stored in said microcode storage means being operable for controlling said steering means;

memory means connected to said signal bus and storing data including program instructions;

fetching means operably connected to said signal bus for fetching program instructions from said memory means and addressing said microcode storage means in response to said program instructions for accessing selected microcode instructions therefrom;

a system clock operably connected to said data register stack, said microcode storage means, said steering means, said memory means and said fetching means for providing timing functions as successive clock cycles; and said steering means executing said selected microcode instructions as accessed from said microcode storage means to manipulate the data in said data registers by transferring data between respective data registers and/or between respective data registers and said signal bus as determined by said selected microcode instructions within a predetermined number of cycles of said system clock.

2. The data processor of claim 1 wherein said steering means executes the microcode instructions within a single cycle of said system clock.

3. The signal processor of claim 1 wherein said steering means comprises:

first transfer means operably interconnecting the outputs of said plurality of data registers with said signal bus for selectively transferring data from at least one of said data registers to said signal bus;

second transfer means operably interconnecting the inputs of said plurality of data registers with said signal bus for selectively transferring data from said signal bus to the input of at least one of said data registers; and third transfer means operably interconnecting the outputs of said plurality of data registers with the inputs thereof for selectively transferring data from the output of at least one of said data registers to the input of at least one of said data registers;

said first, second, and third transfer means being operable to transfer data in accordance with the microcode instructions accessed from said microcode storage means.

4. The data processor of claim 1 wherein said steering means comprises:

a plurality of output data buses;

output connecting means for connecting the output of selected ones of said data registers to selected ones of said output data buses;

a plurality of input data buses;

input connecting means for connecting selected ones of said input data buses to the inputs of selected ones of said data registers;

first gating means for selectively connecting at least one of said output data buses to said data bus;

second gating means for selectively connecting at least one of said input data buses to said data bus; and third gating means for selectively connecting at least one of said input data buses to at least one of said output data buses to allow data transfer to occur therebetween;

said input and output connecting means and said first, second and third gating means operable to transfer data in accordance with said microcode instructions accessed from said microcode storage means.

5. The signal processor of claim 1, further comprising stack pointer means operably associated with said plurality of data registers of determining the top priority of a selected one of said data registers with respect to the remaining ones of said plurality of data registers such that the relative position of the data in said data registers can be determined.

6. The signal processor of claim 5, further comprising a plurality of overflow data registers operably connected to said plurality of data registers for receiving data from the lowest priority one of said data registers when additional data causing the full data capacity of said data registers to be exceeded is input to the highest priority one of said data registers, said overflow data registers inputting data back into the lowest priority one of said data registers when said data registers are at less than full capacity.

7. The signal processor of claim 1, further comprising:

second memory means for storing a plurality of lists of program instructions corresponding to microcode addresses of said microcode storage means and connected to said signal bus, each said list containing a sequence of program instructions; and means for addressing said second memory means to access a selected list of program instructions for placing said microcode addresses corresponding to the accessed selected list of program instructions on said signal bus such that a sequence of microcode instructions is performable in a group.

8. The data processor of claim 1, further comprising arithmetic logic means operably connected to said steering means to receive the output from at least two of said data registers to perform arithmetic and logical functions thereon; and means for selectively interconnecting the output of said arithmetic logic means with said data bus and with the input of selected ones of said data registers.

9. A signal processor for executing multiple tasks within a single cycle of an onboard clock, comprising:

a main signal bus for transmittal of data and program instructions therein;

program instruction means for placing program instructions and data on said signal bus;

a last-in first-out parameter stack for storing data therein, said parameter stack having:

a plurality of data registers disposed in a parallel configuration, and stack pointer means operably associated with said plurality of data registers for determining the top priority of a selected one of said data registers with respect to the remaining ones of said plurality of data registers for data processing operations, the output and input of all of said data registers simultaneously addressable;

a plurality of output parameter buses;

first interfacing means for selectively connecting each of said output parameter buses to the output of a select one of said data registers;

a plurality of input parameter buses;

a second interfacing means for selectively connecting each of said input parameter buses to the input of a select one of said data registers;

arithmetic logic means selectively interconnecting with said output parameter buses for performing arithmetic and logic operations upon the data as provided by outputs of select ones of said data registers;

third interfacing means for selectively connecting the output of said arithmetic logic means with one of said input parameter buses such that the data output thereof is storable in a select one of said data registers;

fourth interfacing means for selectively connecting one of said output parameter buses with one of said input parameter buses such that data in one of said data registers can be directly input to another of said data registers;

control means for controlling said first, second, third, and fourth interfacing means and said arithmetic logic means to execute a given task on the data in said data registers;

microcode storage means for storing a microcode instructions for said control means; and retrieving means operably connected to said signal bus and retrieving program instructions therefrom, said program instruction means controlling said microcode storage means in response to program instructions on said signal bus to output a selected microcode instruction to said control means such that the data stored in said data registers can be manipulated by said first, second, third, and fourth interfacing means and said arithmetic logic means by transferring data between respective data registers, by enabling arithmetic and logic operations to be performed upon the data provided by the outputs of select ones of said data registers, by transferring data from said arithmetic logic means to inputs of select ones of said data registers, and by transferring data between respective data registers and said signal bus as determined by said selected microcode instruction.

10. The data processor of claim 9 wherein said stack pointer means comprises an up/down counter controlled by said control means for determining the one of said data registers having the top priority.

11. The signal processor of claim 9 wherein said arithmetic logic means comprises an arithmetic logic unit with first and second inputs for selective connection with separate ones of said output parameter buses to interface with the outputs of select ones of said data registers, said arithmetic logic unit performing arithmetic and logic operations on the data as provided by the outputs of said select ones of said data registers to said first and second inputs of said arithmetic logic unit.

12. The signal processor of claim 9, further comprising an overflow last-in first-out stack of data registers operably connected to said data registers of said parameter stack for receiving data from the lowest priority one of said data registers of said parameter stack such that data input to said parameter stack beyond its data storage capacity causes the lowest priority data to be transferred from said parameter stack to said overflow stack for storage therein and removal of data from said parameter stack causes data in said overflow stack to be input to the lowest priority one of said data registers of said parameter stack.

13. The signal processor of claim 9, further comprising:

a last-in first-out return stack of data registers; and return stack interface means for selectively connecting said return stack with said signal bus such that data stored in said data registers of said parameter stack can be selectively stored in the data registers of said return stack for later retrieval thereof, said return stack interface means controlled by said control means.

14. The data processor of claim 9 wherein said microcode storage means comprises a read only memory.

15. The signal processor of claim 9 wherein said program instruction means comprises a threaded instruction processor, said threaded instruction processor having:

storage means for storing a plurality of lists, each list comprising a plurality of program instructions for said microcode storage means, said storage means being operably connected to said signal bus;

means for addressing said storage means at the beginning of a select one of said lists; and means for sequentially placing each program instructions of said select one of said lists on said signal bus such that said retrieving means can obtain access to said program instructions, the next sequential instruction being placed on said signal bus during execution of the preceding instruction by said control means.

16. The signal processor of claim 9, further comprising:

a shadow last-in first-out parameter stack for storing data therein, said shadow parameter stack having:

a plurality of shadow data registers disposed in a parallel configuration, and shadow stack pointer means operably associated with said plurality of shadow data registers for determining the top priority of a selected one of said shadow data registers with respect to the remaining ones of said plurality of shadow data registers for data processing operations, the output and input or all of said shadow data registers simultaneously addressable;

switching means operably associated with said first and second interfacing means and having first and second states, said switching means when in its first state enabling the operation of said parameter stack while disconnecting said shadow parameter stack from the signal processor, and said switching means when in its second state inhibiting said first and second interfacing means from selectively connecting said output and input parameter buses, respectively, to said data registers in said parameter stack while enabling said first and second interfacing means to selectively connect said input and output parameter buses, respectively, to said shadow data registers in said shadow parameter stack; and timing means for activating said switching means to assume its second state on a periodic basis to interrupt the operation of said parameter stack in response to microcode instructions input to said control means and enabling said shadow parameter stack to operate in response to microcode instructions input to said control means such that said shadow parameter stack is employed in the operation of an entirely differently program in parallel to the operation of the program employed in relation to said parameter stack.

17. A threaded interpretive data processor, comprising:

a signal bus for transmittal of data and program instructions therein;

program means for placing program instructions on said signal bus;

a last-in first-out data stack having a plurality of data registers for storage of data therein, each of said data registers simultaneously addressable to input data into a plurality of said data registers and to output data from a plurality of said data registers;

arithmetic logic means having at least two inputs for performing arithmetic and logic operations on data input thereto;

first bus means operably connecting the outputs of said plurality of data registers with one input of said arithmetic logic means for transferring data from a select one of said data registers to said one input of said arithmetic logic means;

second bus means operably connecting the outputs of said plurality of data registers with another input of said arithmetic logic means for transferring data from a select one of said data registers to said another input of said arithmetic logic means;

third bus means operably connecting the output of said arithmetic logic means with the inputs of said plurality of data registers and said signal bus for selectively transferring the output of said arithmetic logic means to a select one of said data registers or to said signal bus;

fourth bus means operably connecting said second bus means with the inputs of said plurality of data registers for transferring data from the second bus means to the input of a select one of said data registers;

microcode storage means for storing microcode instructions at predetermined address locations therein, said microcode instructions stored in said microcode storage means being operable for controlling said first, second, third and fourth bus means and said arithmetic logic means;

addressing means operably connected to said signal bus for accessing program instructions from said program means and addressing said microcode storage means in response to said program instructions to output select ones of the stored microcode instructions; and control means for controlling data flow on said first, second, third and fourth bus means and arithmetic logic means in response to microcode instructions selected by said addressing means such that data stored in said data registers in said data stack can be simultaneously manipulated and operated thereon by said arithmetic logic means by transferring data between respective data registers, by enabling arithmetic and logic operations to be performed upon the data provided by outputs of select ones of said data registers, by transferring data from said arithmetic logic means to inputs of select ones of said data registers, and by transferring data between respective data registers and said signal bus as determined by said selected microcode instructions.

18. The threaded interpretive data processor of claim 17, further comprising a last-in first-out overflow stack of data registers operably connected to said data registers of said last-in first-out data stack for receiving the overflow data from said data registers of said data stack such that data from the lowest priority data register in said data stack overflows into said overflow stack for storage therein.

19. The threaded interpretive data processor of claim 17, further comprising:

microcode address storage means operably connected to said signal bus for storing a plurality of lists of microcode addresses at select locations therein, each said list containing a sequence of microcode addresses;

means for addressing said microcode address storage means to access a selected list of microcode addresses in response to program instructions placed on said signal bus by said program means for placing said microcode addresses of the accessed selected list on said signal bus in sequence; and said control means being operably associated with said list-selecting addressing means to sequentially provide said microcode addresses in the selected one of said lists to said microcode storage means to output select ones of the stored microcode instructions corresponding to the microcode addresses included in the selected list such that the microcode instruction located at each microcode address location of said microcode storage means causes said control means to manipulate the data in said data stack.

20. The threaded interpretive data processor of claim 17 wherein said last-in first-out data stack having a plurality of data registers comprises a primary data stack, further comprising:

a secondary last-in first-out data stack having a plurality of data registers for storage of data therein, said secondary data registers being simultaneously addressable to input data into a plurality of said secondary data registers and to output data from a plurality of said secondary data registers;

said first bus means operable to transfer data from a select one of said secondary data registers to said one input of said arithmetic logic means;

said second bus means operable to transfer data from a select one of said secondary data registers to said another input of said arithmetic logic means;

said third bus means operable to transfer the output of said arithmetic logic means to a select one of said secondary data registers or to said signal bus;

said fourth bus means operable to transfer data from said second bus means to the input of a select one of said secondary data registers;

secondary control means for operating said secondary data stack independent of said primary data stack by controlling data flow on said first, second, third and fourth bus means and arithmetic logic means in relation to the inputs and outputs of said secondary data registers;

secondary addressing means operably connected to said signal bus for accessing program instructions from said program means and addressing said microcode storage means in response to said program instructions to output select ones of the stored microcode instructions; and timing means for periodically activating said secondary control means and deactivating said control means to enable data in said secondary data registers to be manipulated by said first, second, third and fourth bus means and said arithmetic logic means such that data manipulation can occur in said secondary data stack in parallel with data manipulation in said primary data stack.

21. A threaded interpretive data processor, comprising:

a signal bus for transmittal of data and program instructions therein;

a primary last-in first-out data stack having a plurality of primary data registers for storage of data therein, said primary data registers simultaneously addressable for input of data thereto or retrieval of data therefrom;

an arithmetic logic unit for performing arithmetic and logic operations on data input thereto, said arithmetic logic unit having two inputs and one output;

first interface/select means operably connecting the outputs of said primary data registers with one input of said arithmetic logic unit for selecting data from one of said primary data registers for input to said one input of said arithmetic logic unit;

second interface/select means operably connecting the outputs of said primary data registers with the other input of said arithmetic logic unit for selecting data from one of said primary data registers for input to said other input of said arithmetic logic unit;

third interface/select means operably connecting the inputs of said primary data registers or said signal bus with the output of said arithmetic logic unit for selecting either one of said primary data registers or said signal bus and transferring data from the output of said arithmetic logic unit to the selected one of said primary data registers on said signal bus;

fourth interface/select means operably connecting the inputs of said primary data registers with said second interface/select means for selecting one of said primary data registers and transferring data from said second interface/select means to the input of the selected one of said primary data registers;

control means for controlling the operation of said first, second, third and fourth interface/select means and said arithmetic logic unit in response to microcode instuctions such that data stored in said primary data registers can be manipulated by transferring data between respective primary data registers, by enabling arithmetic and logic operations to be performed upon the data provided by outputs of select ones of said primary data registers, by transferring data from said arithmetic logic unit to inputs of select ones of said primary data registers, and by transferring data between respective primary data registers and said signal bus;

a read only memory for storing the microcode instructions at predetermined address locations therein;

first address means for addressing said predetermined address location in said read only memory to retrieve select ones of the microcode instructions, said first address means being operably connected to said signal bus;

storage means for storing microcode addresses for said read only memory, said storage means being operably connected to said signal bus;

programming means for placing program signals on said signal bus; and second address means for addressing said storage means in response to program signals placed on said signal bus from said programming means, a sequence of microcode addresses being accessed from said storage means and placed on said signal bus in response to the addressing of said storage means by said second address means for retrieval by said first address means to address one of said predetermined address locations in said read only memory for retrieving a selected one of said microcode instructions to provide instructions for said control means to control said first, second, third and fourth interface/select means and said arithmetic logic unit to manipulate data stored in said primary data registers.

22. The threaded interpretive data processor of claim 21 wherein said storage means comprises a read only memory for storing microcode addresses.

23. The threaded interpretive data processor of claim 21 wherein the primary data registers in said data primary data stack are prioritized in descending order of priority from the top to the bottom of the primary data stack, further comprising an overflow last-in first-out stack operably connected to said primary data stack and having a plurality of overflow data registers for receiving the contents of the lowest priority primary data register in said primary data stack when additional data is placed into said primary data stack at a time when the data storage capacity thereof is full.

24. The threaded interpretive data processor of claim 21, further comprising:

a last-in first-out return stack having a plurality of data registers for storage of data therein; and means selectively connecting said return stack with said signal bus under the control of said control means such that data is storable in said return stack in response to microcode instructions input to said control means.

25. The threaded interpretive data processor of claim 1, further comprising:

a secondary data stack having a plurality of secondary data registers for storing data therein;

interrupt/connect means for inhibiting said first, second, third and fourth interface/select means from selecting primary data registers in said primary data stack upon actuation thereof;

said interrupt/connect means when actuated enabling said first, second, third and fourth interface/select means to select secondary data registers from said secondary data stack under the control of said control means in response to the addressed one of said microcode instructions; and timing means for controlling the actuation of said interrupt/connect means to periodically enable said secondary data stack to be connected to said first, second, third and fourth interface/select means such that an independent sequence of microcode addresses accessed from said storage means may be provided for retrieval and execution of microcode instructions to manipulate data in said secondary data stack independently of data in said primary data stack.

26. A threaded interpretive data processor, comprising:

an address bus;

a last-in first-out data stack having a plurality of data registers for storage of data therein, each of said data registers simultaneously addressable to input data into a plurality of said data registers and to output data from a plurality of said data registers;

arithmetic logic means having an output and at least two inputs for performing arithmetic and logic operations on data input thereto;

first bus means operably connecting the outputs of said plurality of data registers with one input of said arithmetic logic means for transferring data from a select one of said data registers to said one input of said arithmetic logic means;

second bus means operably connecting the outputs of said plurality of data registers with another input of said arithmetic logic means for transferring data from a select one of said data registers to said another input of said arithmetic logic means;

third bus means operably connecting the output of said arithmetic logic means with the inputs of said plurality of data registers and said main signal bus for selectively transferring the output of said arithmetic logic means to a select one of said data registers or to said main signal bus;

fourth bus means operably connecting said second bus means with the inputs of said plurality of data registers for transferring data from the second bus means to the input of a select one of said data registers;

microcode storage means operably connected to said main signal bus and said address bus, said microcode storage means defining a first level memory for storing microcode instructions in the form of addresses at predetermined address locations therein, said microcode instructions stored in said microcode storage means being operable for controlling said first, second, third and fourth bus means and said arithmetic logic means;

addressing means operably connected to said main signal bus for addressing said microcode storage means in response to program instructions to output select ones of the stored microcode instructions from said microcode storage means, said addressing means including an instruction register connected to said main signal bus for receiving a coded address as program instructions from said main signal bus, and an address decoder interposed between said instruction register and said microcode storage means and operable to receive a coded address output from said instruction register for input to said microcode storage means as a decoded address;

a control latch disposed at the output of said microcode storage means for receiving the addressed microcode instruction as output from said microcode storage means in a latched condition therein;

control means for controlling data flow on said first, second, third and fourth bus means and arithmetic logic means in response to microcode instructions selected from said microcode storage means as provided thereto by said instruction register and said address decoder such that data stored in said data registers in said data stack can be simultaneously manipulated and operated thereon by said arithmetic logic means by transferring data between respective data registers, by enabling arithmetic and logic operations to be performed upon the data provided by outputs of select ones of said data registers, by transferring data from said arithmetic logic means to inputs of select ones of said data registers, and by transferring data between respective data registers and said main signal bus as determined by said selected microcode instructions;

microcode address storage means operably connected to said main signal bus and to said address bus, said microcode address storage means defining a second level memory for storing a plurality of lists of microcode addresses at select locations therein, each said list containing a sequence of microcode addresses;

means for addressing said microcode address storage means to access a selected list of microcode addresses in response to program instructions placed on said main signal bus for placing said microcode addresses of the accessed selected list on said main signal bus in sequence, said means for addressing said microcode address storage means including an instruction pointer connected to said main signal bus and to said address bus and interposed therebetween, said instruction pointer comprising a data register for clocking through an address from the main signal bus to said address bus for input to said microcode address storage means;

said microcode addresses of the accessed selected list from said microcode address storage means being placed on said main signal bus in dependence upon the output of a predetermined functional microcode instruction by said control latch as output from said microcode storage means; and said control means being operably associated with said list-selecting addressing means to sequentially provide said microcode addresses in the selected one of said lists to said microcode storage means to output select ones of the stored microcode instructions corresponding to the microcode addresses included in the selected list such that the microcode instruction location at each microcode address location of said microcode storage means causes said control means to manipulate the data in said data stack.

27. The threaded interpretive data processor of claim 26, further comprising:

a decoder operably connected to said main signal bus and to said instruction pointer for determining whether the address on said main signal bus corresponds to either a primitive instruction or to a higher level instruction for incrementing said instruction pointer when a primitive instruction is sensed and for loading said instruction pointer with the address on said main signal bus to be clocked through to said microcode address storage means when a higher level instruction is sensed.

28. The threaded interpretive data processor of claim 27, further comprising:

a last-in first-out return stack operably connected to said main signal bus and having a plurality of data registers for storage of data therein;

an incrementing register connected to said main signal bus and to said return stack and interposed therebetween;

a control line connecting said incrementing register to said decoder;

said incrementing register being controlled via said decoder by the output of a predetermined control microcode instruction from said control latch, said incrementing register being operable as an incrementing latch in which the incrementing register is incremented by one and data from said main signal bus is clocked through to said return stack in dependence upon said decoder sensing the address on said main signal bus as being included in a main program rather than a list of microcode addresses; and said return stack being operable to transfer the incremented address onto said main signal bus as the next sequential address for the main program upon execution of the selected list of microcode addresses.

29. The threaded interpretive data processor of claim 28, wherein said last-in first-out data stack having a plurality of data registers comprises a primary data stack, and further comprising:

a secondary last-in first-out data stack having a plurality of data registers for storage of data therein, said secondary data registers being simultaneously addressable to input data into a plurality of said secondary data registers and to output data from a plurality of said secondary data registers;

said first bus means operable to transfer data from a select one of said secondary data registers to said one input of said arithmetic logic means;

said second bus means operable to transfer data from a select one of said secondary data registers to said another input of said arithmetic logic means;

said third bus means operable to transfer the output of said arithmetic logic means to a select one of said secondary data registers or to said main signal bus;

said fourth bus means operable to transfer data from said second bus means to the input of a select one of said secondary data registers;

secondary control means for operating said secondary data stack independent of said primary data stack by controlling data flow on said first, second, third and fourth bus means and arithmetic logic means in relation to the inputs and outputs of said secondary data registers;

secondary addressing means operably connected to said main signal bus for addressing said microcode storage means in response to program instructions to output select ones of the stored microcode instructions from said microcode storage means, said secondary addressing means including a secondary instruction register connected to said main signal bus for receiving a coded address as program instructions from said main signal bus for input to said address decoder;

second means for addressing said microcode address storage means to access a selected list of microcode addresses in response to program instructions placed on said main signal bus for placing said microcode addresses of the accessed selected list on said main signal bus in sequence, said second means for addressing said microcode address storage means including a secondary instruction pointer connected to said main signal bus and to said address bus and interposed therebetween, said secondary instruction pointer comprising a secondary data register for clocking through an address from the main signal bus to said address bus for input to said microcode address storage means; and timing means for periodically activating said secondary control means and deactivating said control means to enable data in said secondary data registers to be manipulated by said first, second, third and fourth bus means and said arithmetic logic means such that data manipulation can occur in said secondary data stack in parallel with data manipulation in said primary data stack.

* * * * *